(12) United States Patent
Vitry

(10) Patent No.: US 6,662,405 B2
(45) Date of Patent: Dec. 16, 2003

(54) DETENTED AND DAMPENED HINGE MECHANISM

(75) Inventor: Fabrice Vitry, Worcester (GB)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/143,490

(22) Filed: May 11, 2002

(65) Prior Publication Data

US 2002/0170143 A1 Nov. 21, 2002

Related U.S. Application Data

(60) Provisional application No. 60/290,462, filed on May 12, 2001, and provisional application No. 60/343,639, filed on Oct. 27, 2001.

(51) Int. Cl.[7] .............................. E05D 1/04; E05F 3/20
(52) U.S. Cl. ............................. 16/355; 16/354; 16/277; 16/54
(58) Field of Search ............................. 16/355, 354, 54, 16/50, 277, 278; 188/80, 25, 290, 322.5; 292/336.3; 49/339–341, 348, 349; 296/56, 37.12

(56) References Cited

U.S. PATENT DOCUMENTS

| | | |
|---|---|---|
| 2,162,663 A | 6/1939 | Lockhart |
| 2,205,682 A | 6/1940 | Claud-Mantle |
| 2,212,977 A | 8/1940 | Boer et al. |
| 3,093,258 A | 6/1963 | Turner |
| 4,146,320 A | 3/1979 | Schrader |
| 4,342,135 A * | 8/1982 | Matsuo et al. .................. 16/82 |
| 4,468,836 A * | 9/1984 | Omata ........................... 16/82 |
| 4,672,715 A | 6/1987 | Beckwith |
| 4,838,612 A | 6/1989 | Cross |
| 4,914,782 A | 4/1990 | Rupprechter |
| 4,932,695 A | 6/1990 | Pettit et al. |
| 5,001,809 A * | 3/1991 | Kim et al. ...................... 16/62 |
| 5,050,922 A | 9/1991 | Falcoff |
| 5,121,521 A * | 6/1992 | Hagiwara et al. .............. 16/278 |
| 5,211,431 A | 5/1993 | Koizumi et al. |
| 5,839,548 A * | 11/1998 | Parker et al. .............. 188/82.1 |
| 5,862,896 A * | 1/1999 | Villbrandt et al. .......... 188/293 |
| D447,928 S | 9/2001 | Weiland |
| 6,367,124 B1 * | 4/2002 | Bella et al. .............. 292/336.3 |

FOREIGN PATENT DOCUMENTS

JP    2002331875 A  *  11/2002

* cited by examiner

*Primary Examiner*—Chuck Y. Mah
(74) *Attorney, Agent, or Firm*—Paul & Paul

(57) ABSTRACT

A detented and dampened hinge mechanism with push-pull and pull-push operation is disclosed. The present invention relates generally to a hinge mechanism that includes a first arm and a second arm that are pivotally connected to one another such that the arms can be moved relative to one another between a closed position and an open position. A damper is fitted into a cutout of the second arm such that the damper can engage with a length of teeth of the first arm when the hinge mechanism moves between the open and closed positions. Biasing means is fitted between hooks or bosses of the arms, and biases the first and second arms toward the open position.

19 Claims, 32 Drawing Sheets

DETENTED AND DAMPENED HINGE MECHANISM

RELATED APPLICATIONS

This application relates to the invention of Provisional Application No. 60/290,462 filed May 12, 2001 and Provisional Application No. 60/343,639 filed Oct. 27, 2001.

BACKGROUND OF THE INVENTION

This invention relates generally to hinge mechanisms with push-pull operation. Particularly, the invention relates to such hinge mechanisms, which may be detented to hold a particular position and may have a dampened movement when subjected to the pull-push operation.

Hinge mechanisms, scissor arms, and latches having push-push operations are known in the art. An example of this type of latch is shown in U.S. Pat. No. 4,655,489, issued on Apr. 7, 1987, to Robert H. Bisbing. The latch disclosed in this patent operates by capturing a keeper attached to a door or panel when the keeper is initially pushed into the latch housing. The keeper is released by again pushing the keeper into the housing to disengage the keeper from a catch within the housing, hence the term push-push latch.

An object of the present invention is to provide and improved hinge mechanism with a smooth opening and closing operation.

A second object of this invention is to provide such improved hinge mechanism with a fixedly controlled open position and a fixedly controlled closed position.

A further object of this invention is to provide such a hinge mechanism with controlled biasing for positive movement once said hinge is moved out of its fixed open or fixed closed position.

An even further object of this invention is to provide such a hinge mechanism with structural components for ease of assembly, low profile structure, and reliable operation.

SUMMARY OF THE INVENTION

The objects of the present invention are realized in a detented and dampened hinge mechanism with push-pull and pull-push operation. This hinge mechanism has a first elongate arm and elongate second arm, which move relative to one another in the plane of their elongations thereby pivoting in scissor fashion. A spring biases the scissor arms and the mechanism to the open position. A dampener operates against movement in both directions for push-pull and pull-push operation. A cam cooperates with a curvilinear cam path to implement an articulated motion between the first and second arms as they move relative to one another.

The hinge mechanism has its first arm fixedly attachable to a first non-movable structural member and its second arm, which is pivotally connected to the first arm, fixedly attachable to a movable structural member. Thereby when the arms are moved relative to one another in a scissor fashion between a first closed position and a second open position, the two structural members move relative to one another. The hinge mechanism is applicable to an automotive glove box and other structures.

The second arm carries a damper mechanism that is fitted or snapped into a cutout of the second arm, such that the damper can engage a portion of the first arm and thereby create a controlled movement between the first and second arms. This controlled movement is an inhibiting force that acts against any excessive acceleration and the deceleration of the pivoting motion.

The damper structure includes a pinion gear mounted on the second arm. The pinion gear is connected to a friction or hydraulic clutch. This pinion operates with its teeth engaging a track or length of teeth mounted on the first arm. This length of teeth is a curved toothed track, i.e. a "rack". The pinion rotates and traverses the rack as the hinge arms move between the open and closed positions. A spring structure connected between the two arms biases the first and second arms toward the open position. A detent function is incorporated at both the extreme open and closed rotated (pivoted) positions so that the hinge mechanism operates as a push-pull device.

BRIEF DESCRIPTION OF THE DRAWINGS

The features, advantages and operation of the present invention will become readily apparent and further understood from a reading of the following detailed description of the invention with the accompanying drawings, in which like numeral refer to like elements, in which.

DETAILED DESCRIPTION OF THE INVENTION

Figure 7:
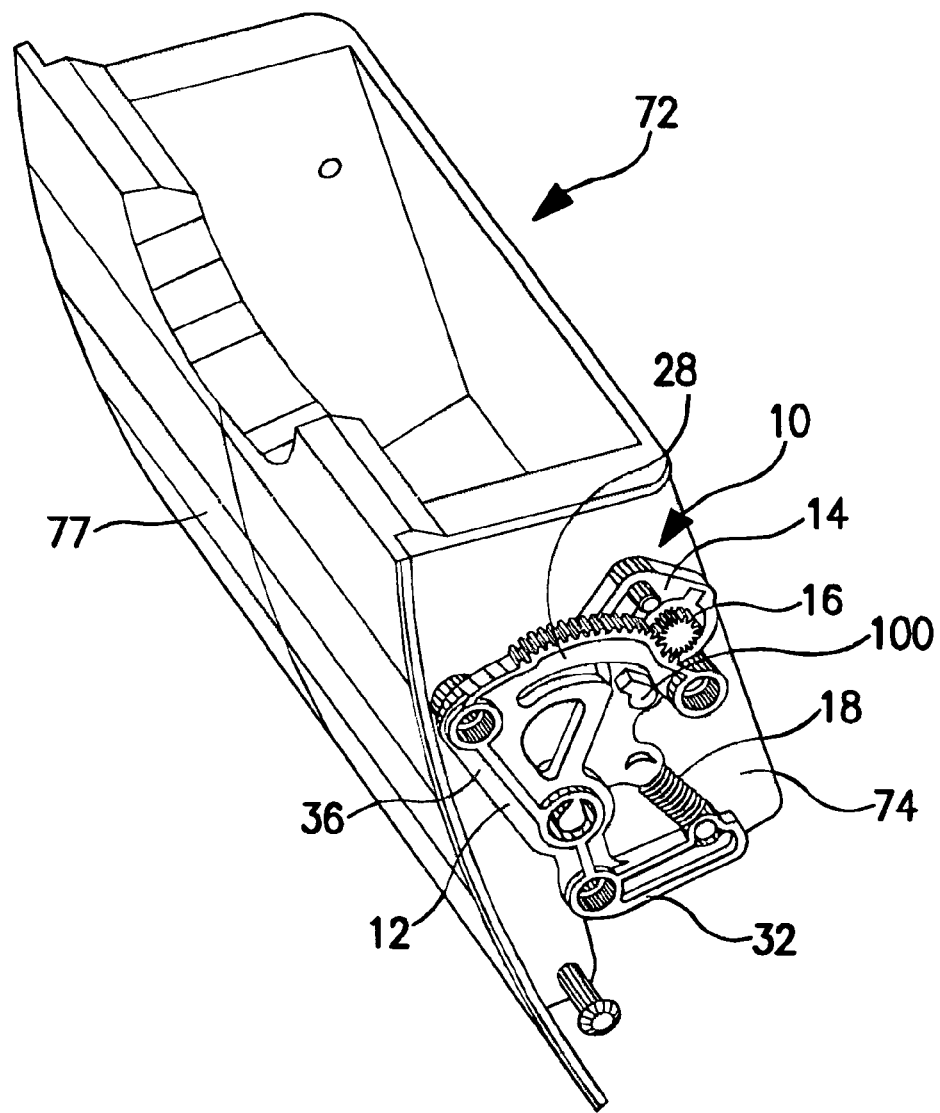
FIG. 7 is a perspective view of an embodiment of the detented and dampened hinge mechanism of the present invention, the hinge mechanism being shown in a closed position and attached or fixed to an enclosure or box removed from the box housing.
Figure 8:
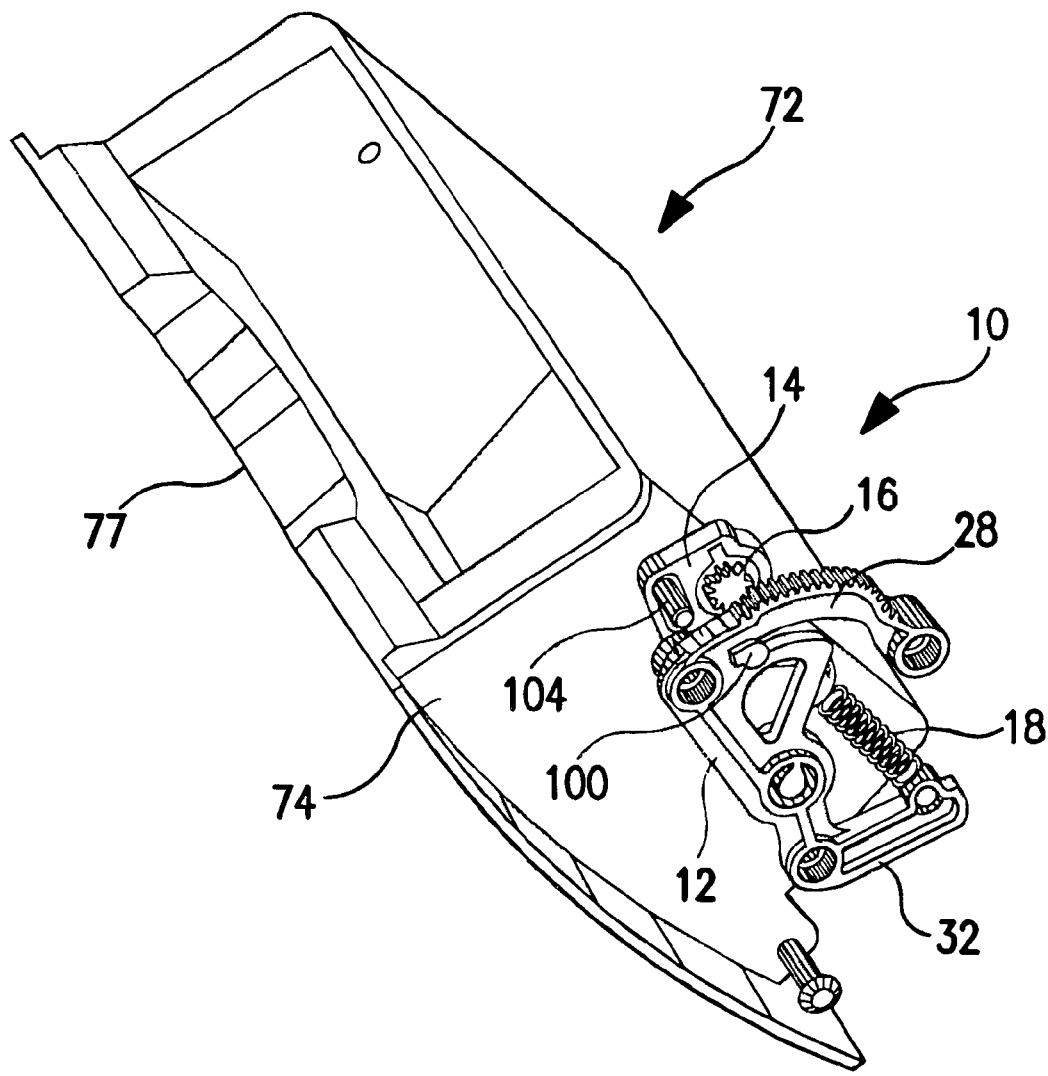
FIG. 8 is a perspective view of an embodiment of the detented and dampened hinge mechanism in accordance with the present invention, the hinge mechanism being shown in an open position and attached or fixed to the box.
Figure 9:
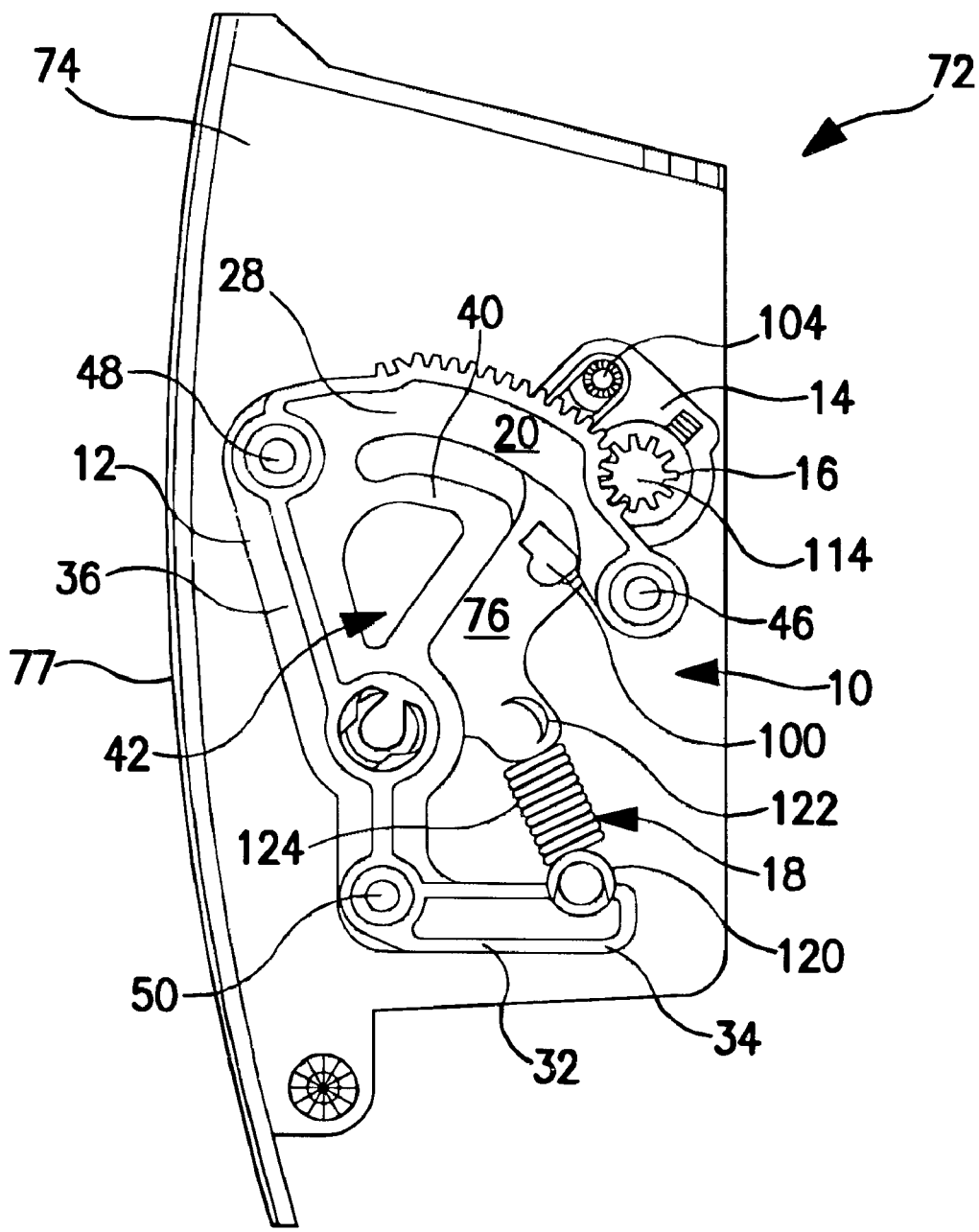
FIG. 9 is a front view of an embodiment of the detented and dampened hinge mechanism of the present invention, the hinge mechanism being shown in a closed position and attached to the side of the box.
Figure 10:
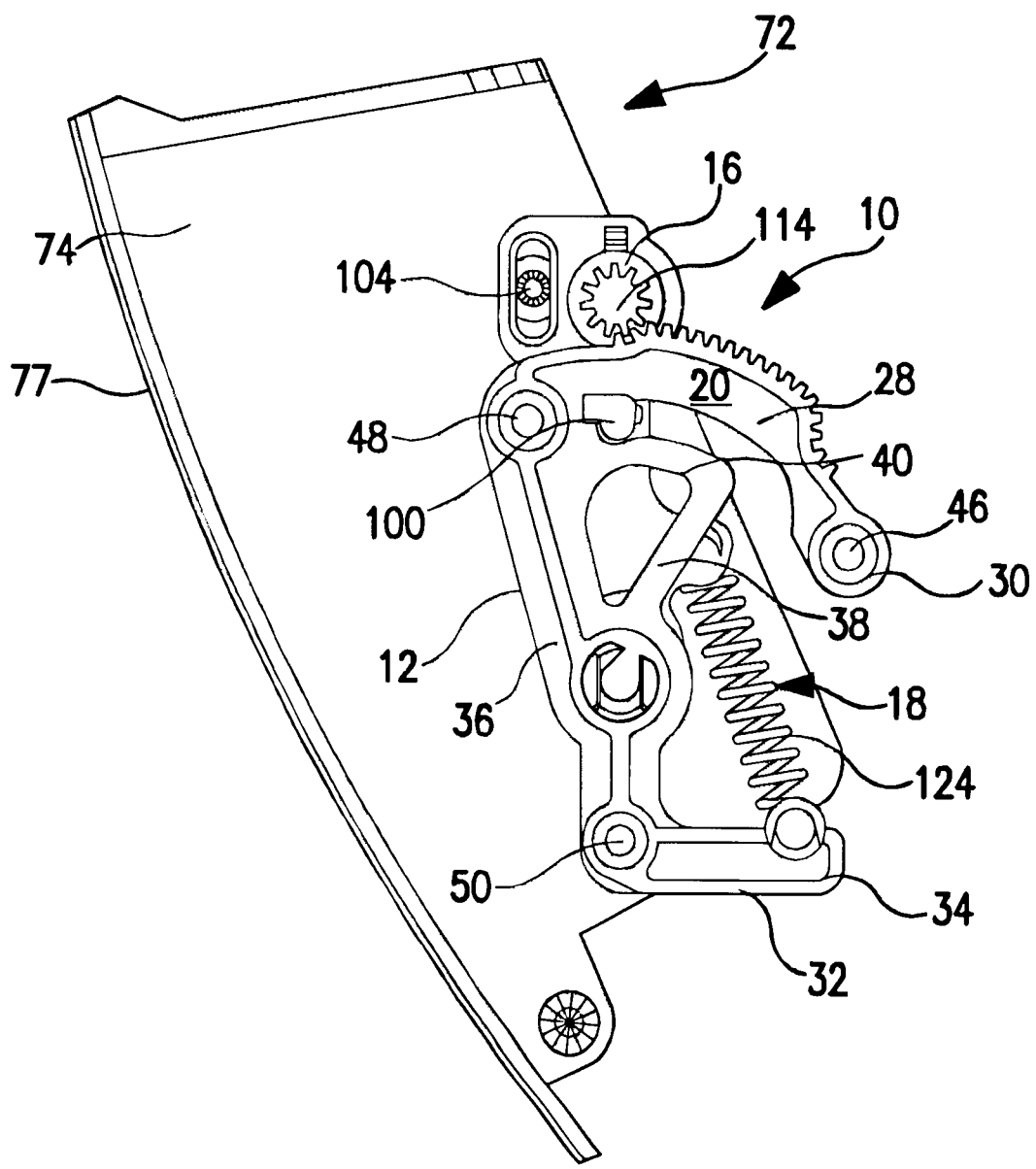
FIG. 10 is a front view of an embodiment of the detented and dampened hinge mechanism of FIG. 9 in an open position.
Figure 11:
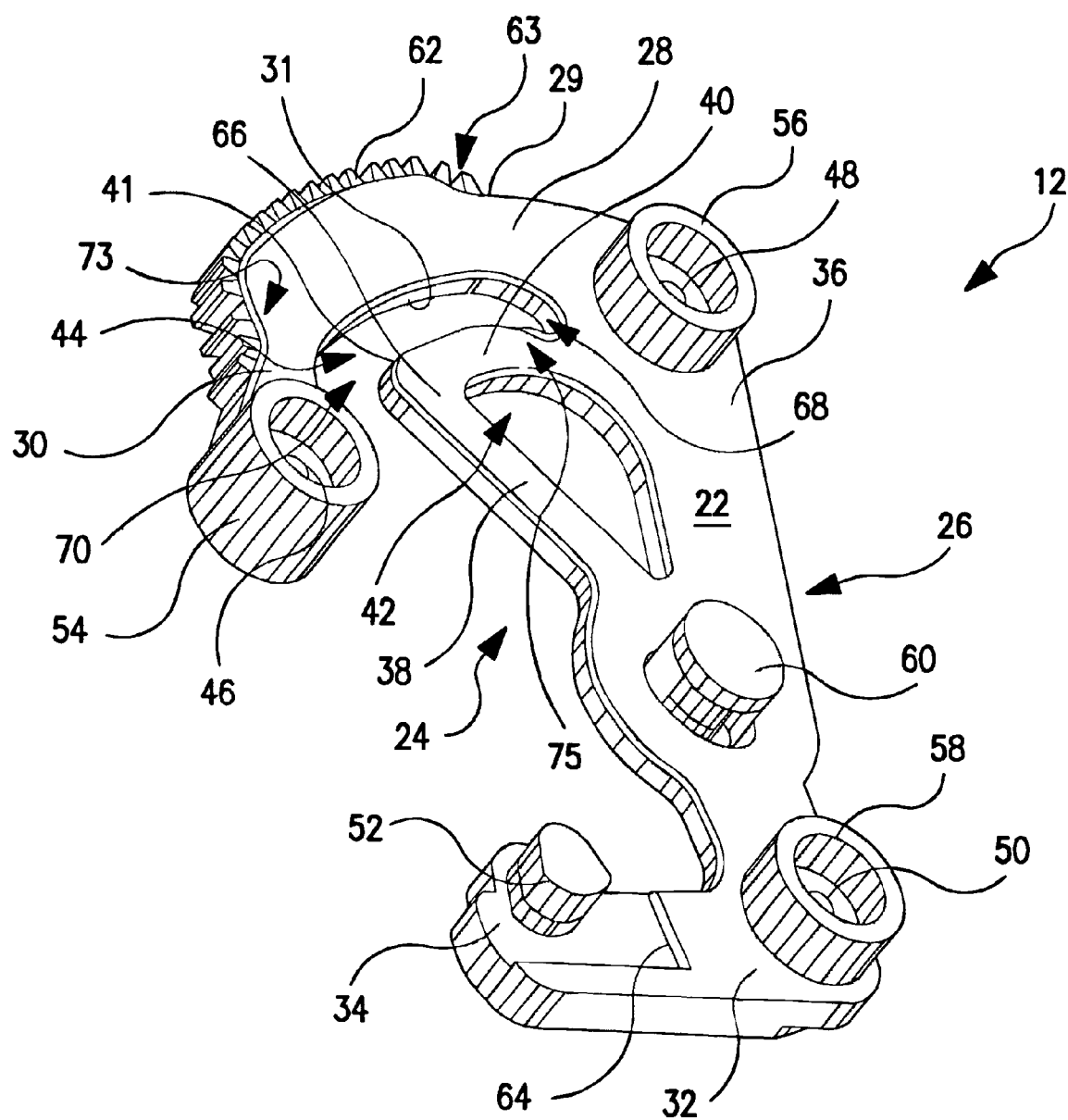
FIG. 11 is a rear, perspective view of a gear arm of the detented and dampened hinge mechanism of FIG. 1.
Figure 12:
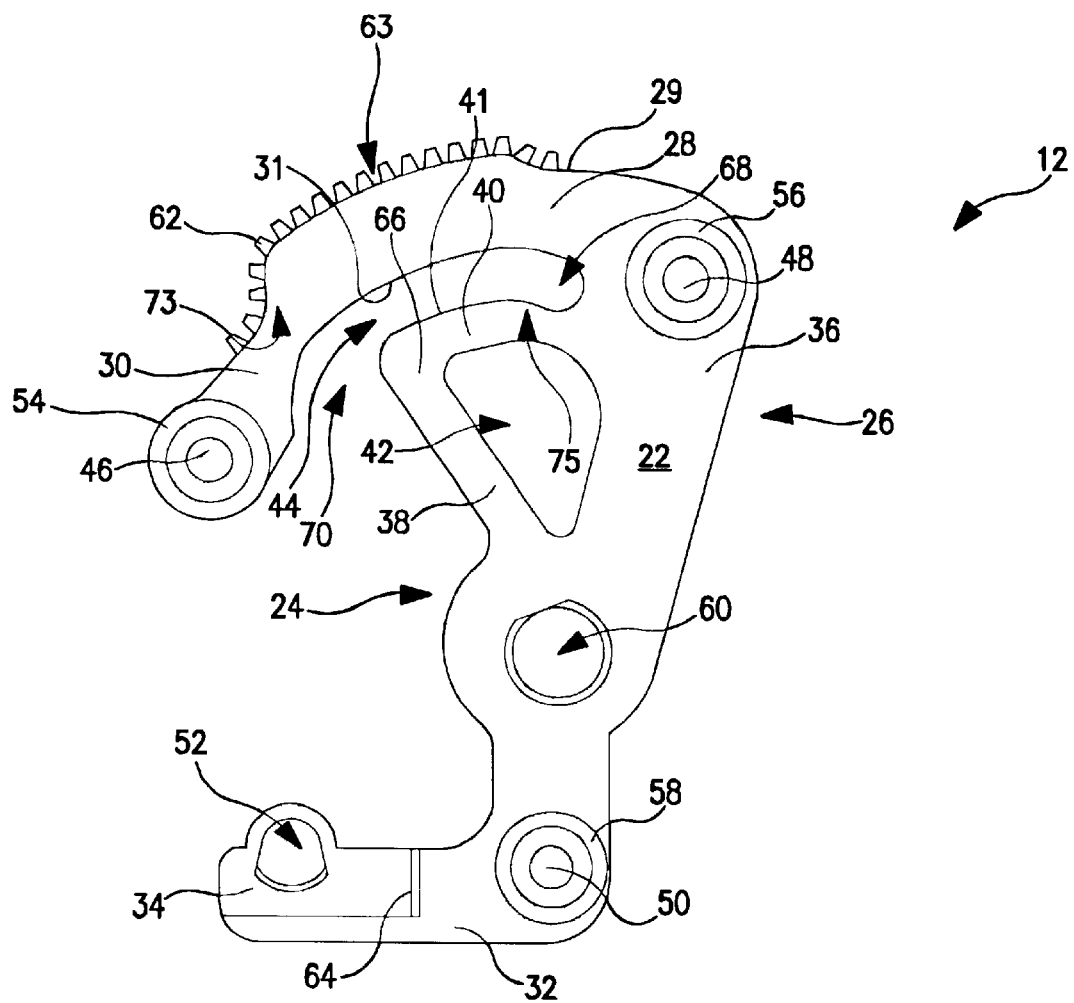
FIG. 12 is a rear view of the gear arm of FIG. 11 of the detented and dampened hinge mechanism.
Figure 13:
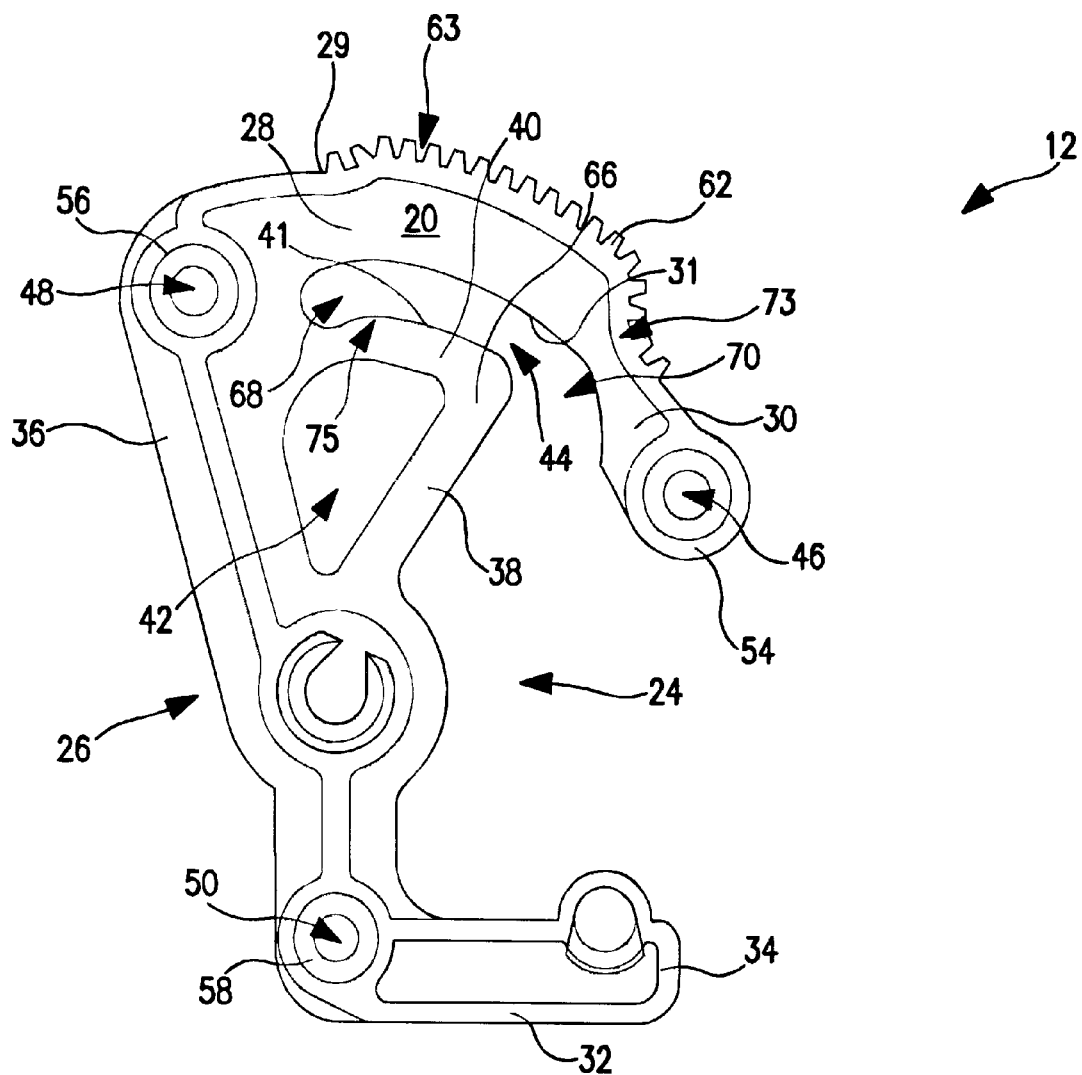
FIG. 13 is a front view of the gear arm of FIG. 11 of the detented and dampened hinge mechanism.
Figure 14:
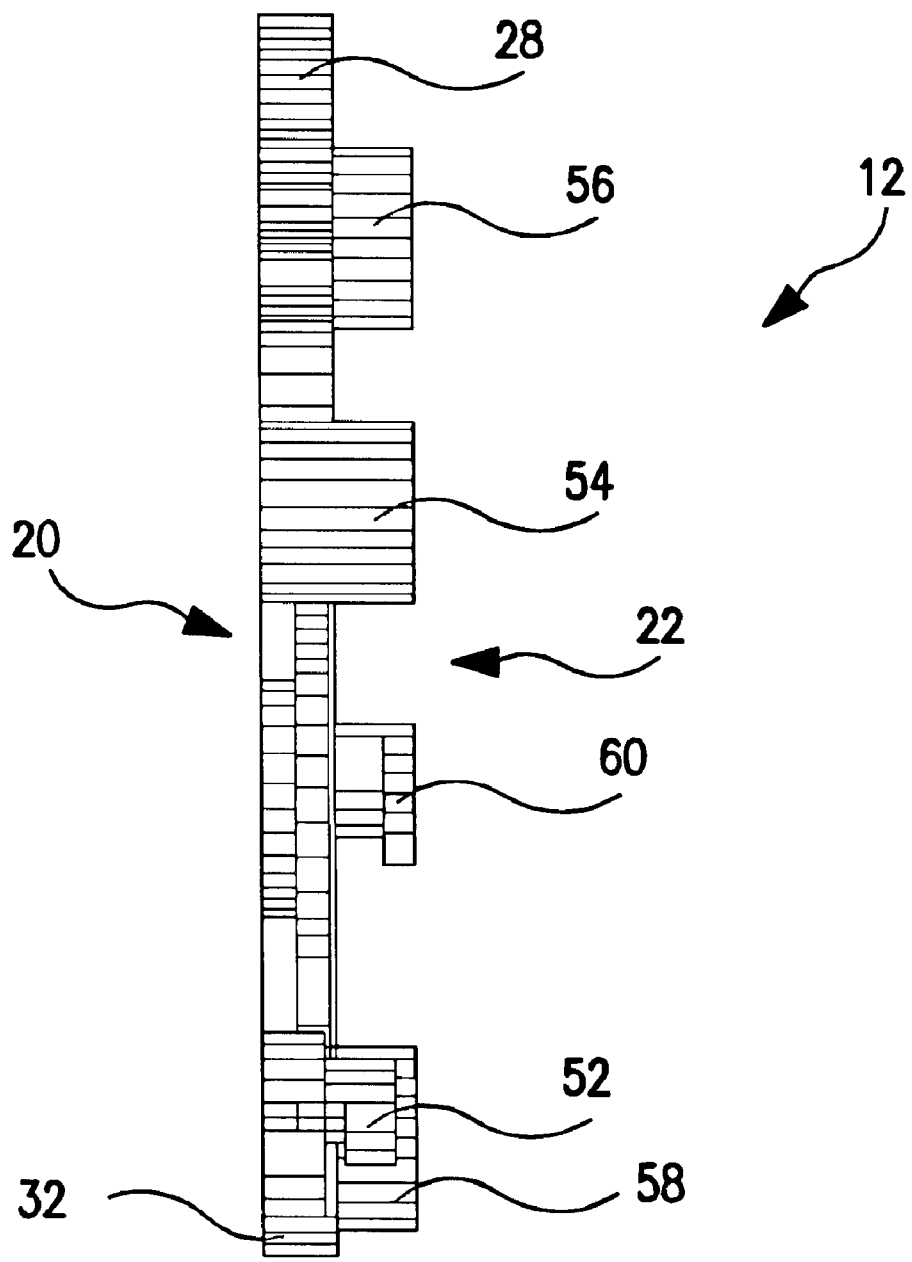
FIG. 14 is a right view of the gear arm of FIG. 11 of the detented and dampened hinge mechanism.
Figure 15:
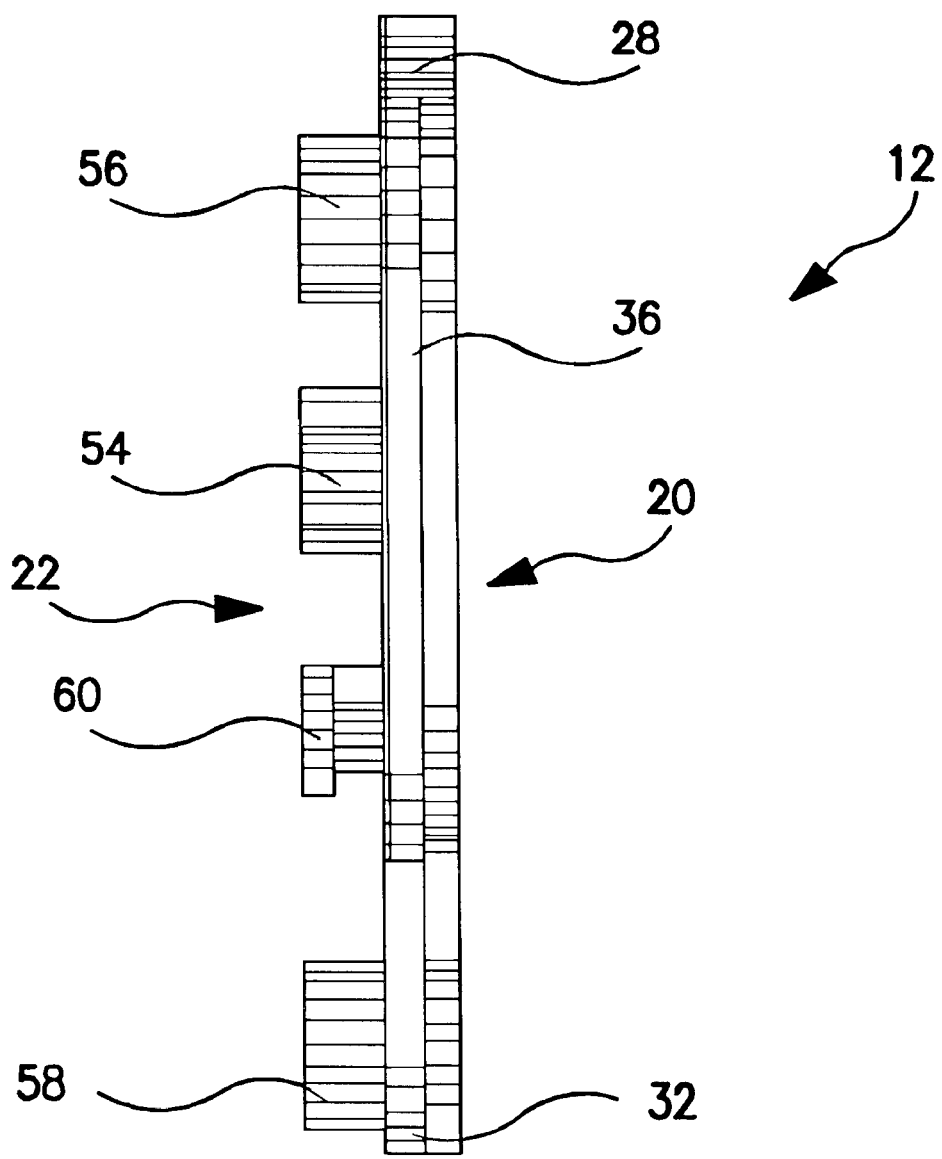
FIG. 15 is a left view of the gear arm of FIG. 11 of the detented and dampened hinge mechanism.
Figure 16:
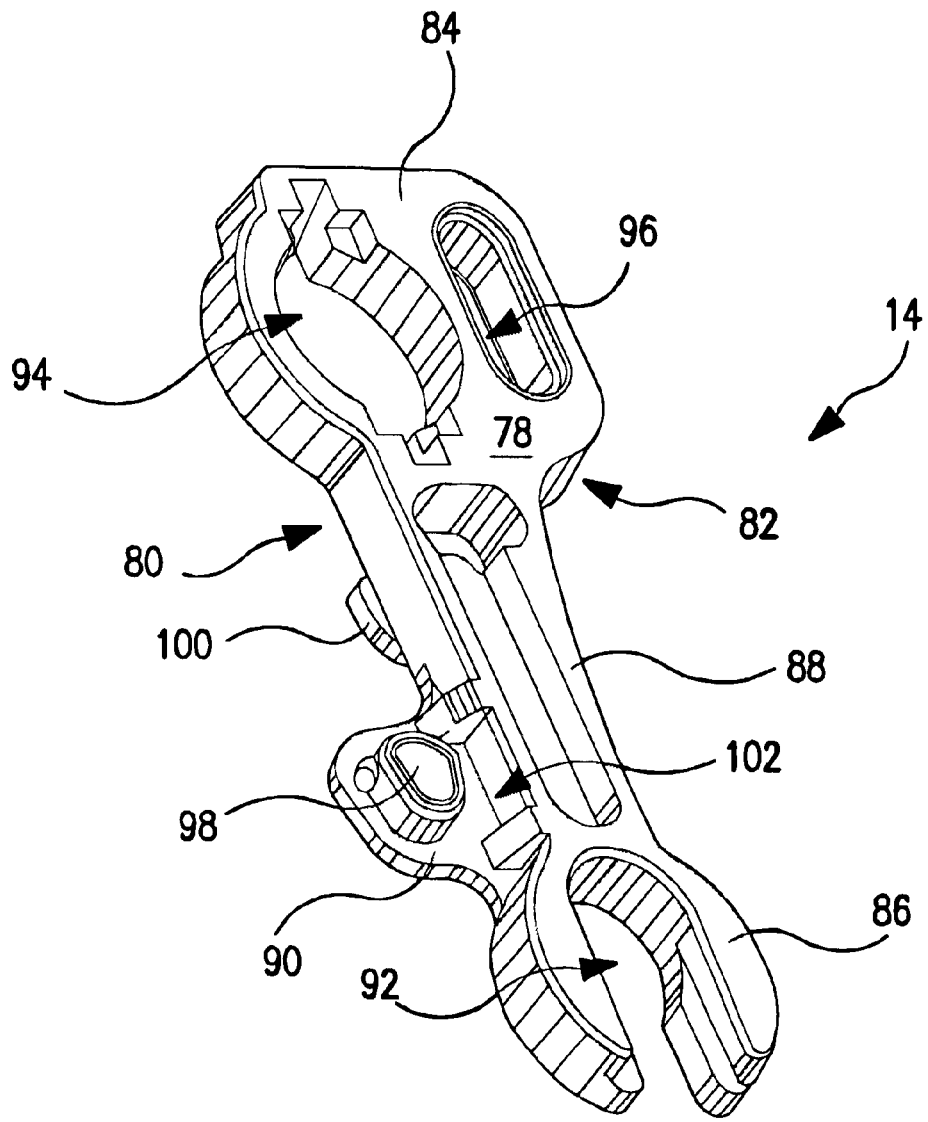
FIG. 16 is a rear, perspective view of a movable arm of the detented and dampened hinge of FIG. 1.
Figure 17:
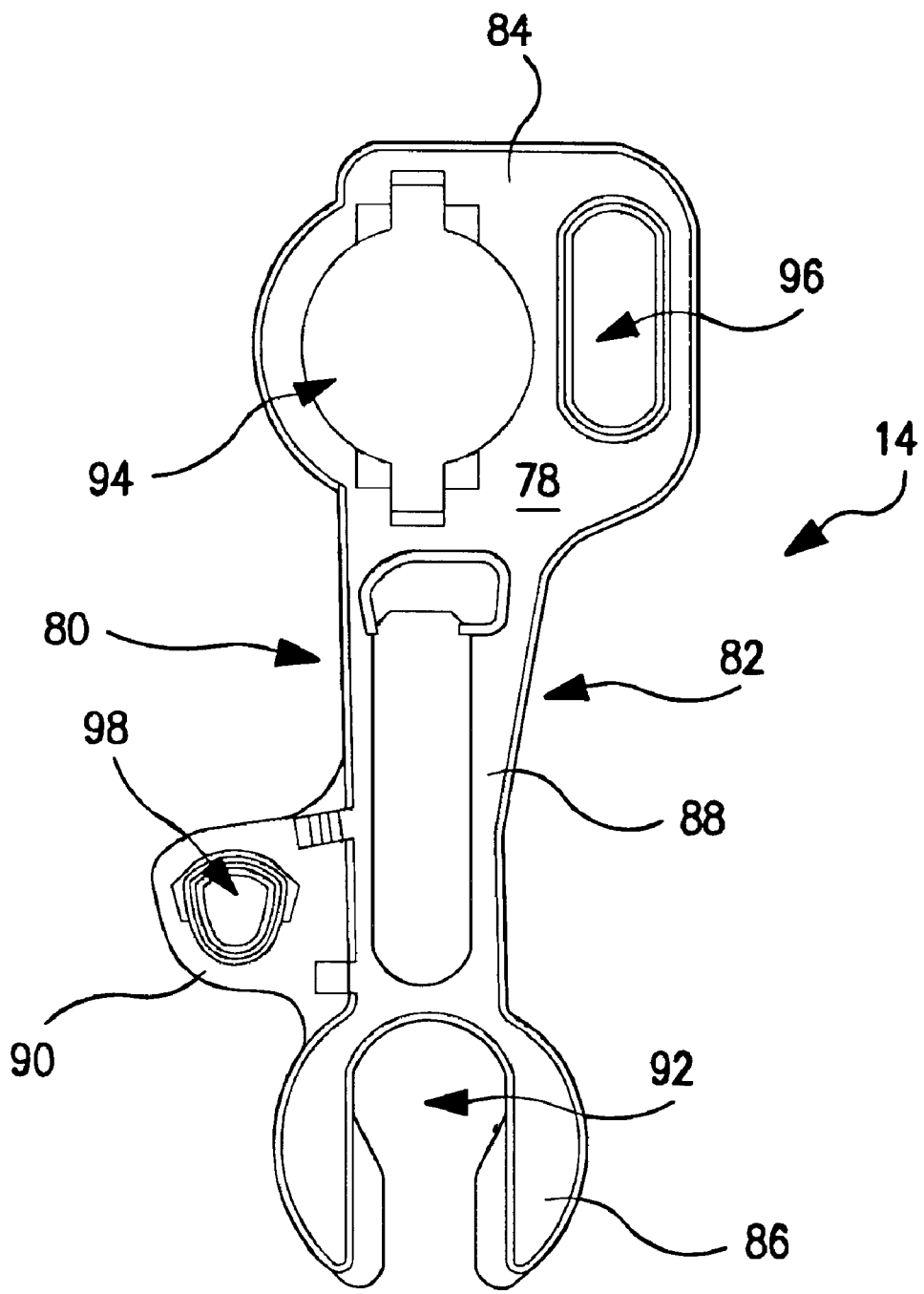
FIG. 17 is a rear view of the movable arm of FIG. 16 of the detented and dampened hinge mechanism.
Figure 18:
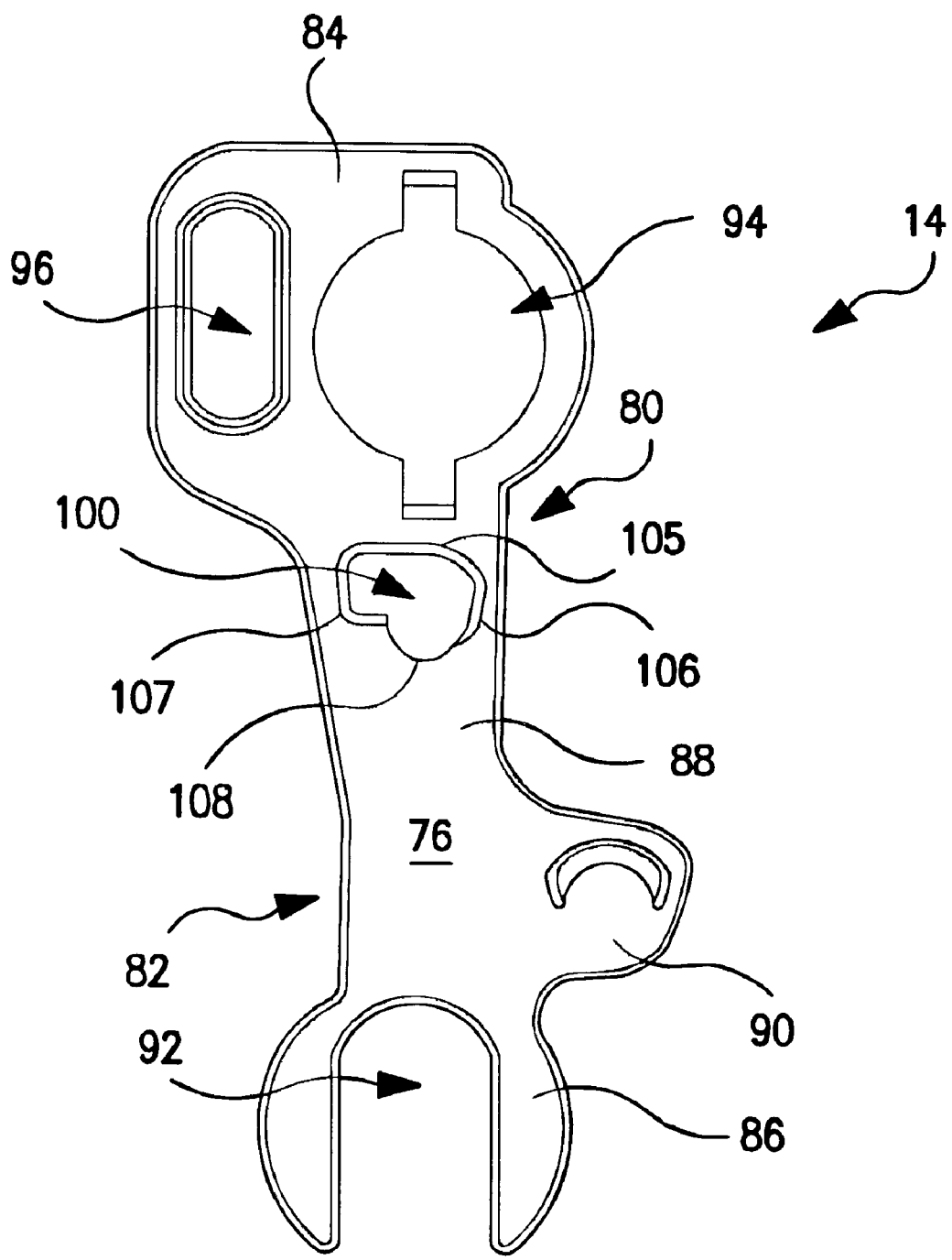
FIG. 18 is a front view of the movable arm of FIG. 16 of the detented and dampened hinge mechanism.
Figure 19:
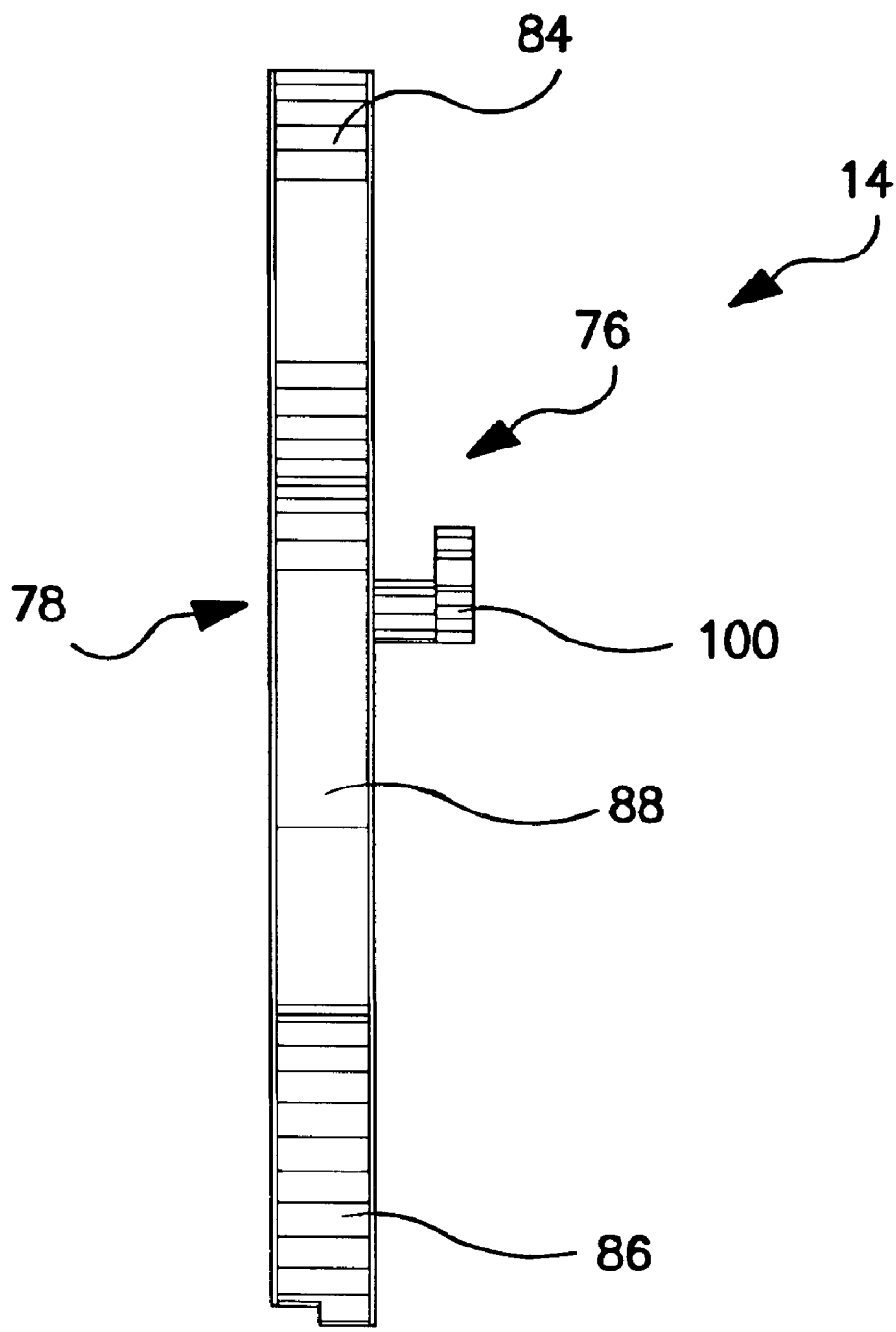
FIG. 19 is a left view of the movable arm of FIG. 16 of the detented and dampened hinge mechanism.
Figure 20:
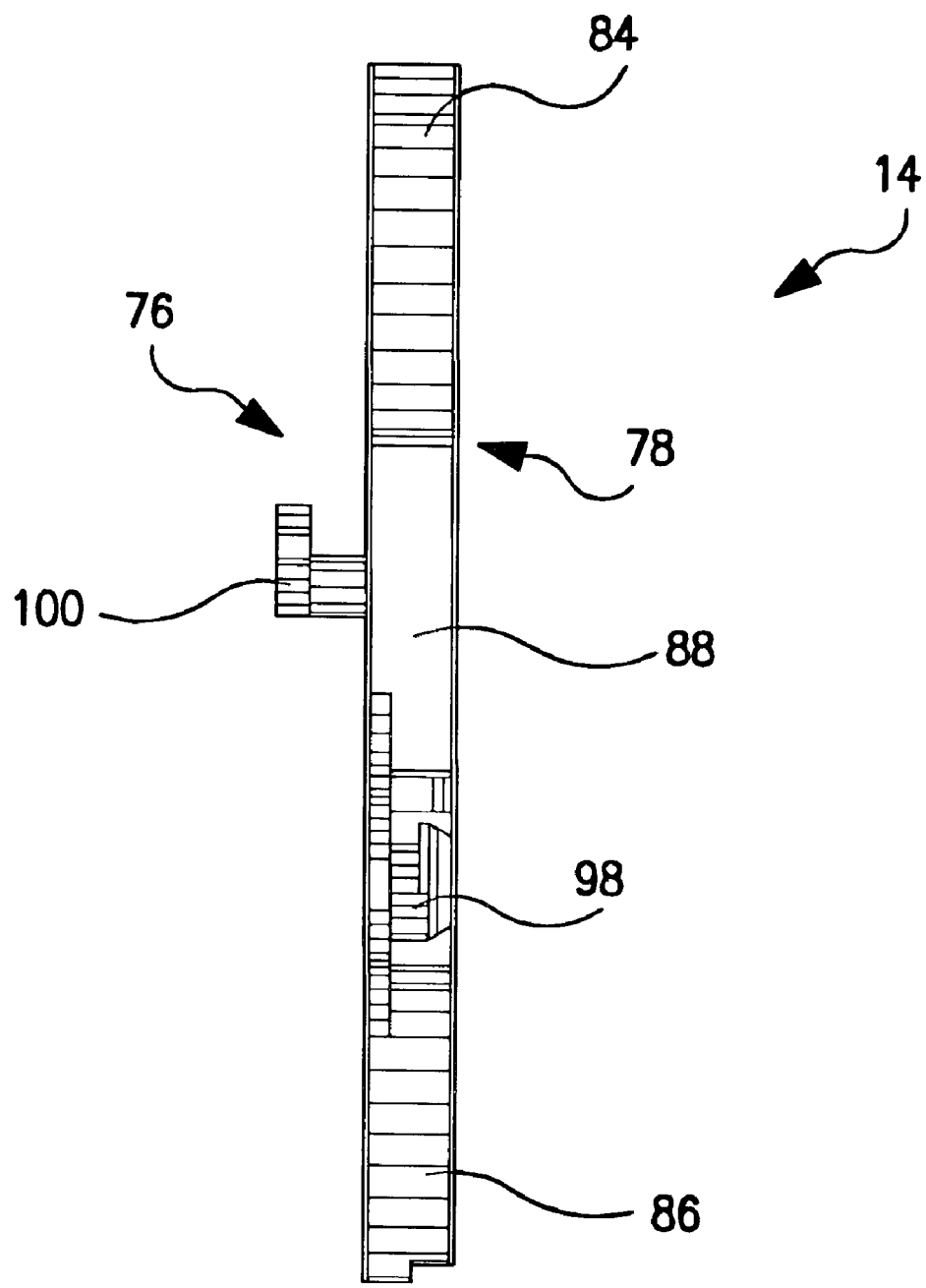
FIG. 20 is a right view of the movable arm of FIG. 16 of the detented and dampened hinge mechanism.

Referring now to the drawings in detail, wherein in FIGS. 1–25, is illustrated a detented and dampened hinge mechanism in accordance with a first embodiment of the present invention. The hinge mechanism 10, as shown in the perspective view of FIGS. 7 and 8, includes as portions thereof, first and second arms 12 and 14 comprising a gear arm 12 and a movable arm 14, a damper 16, and biasing means comprising a compression spring 18. The details of the hinge mechanism 10 of the present this embodiment will be described in more detail below.

The gear arm 12 is illustrated in detail in FIGS. 11–15. The gear arm 12 in this embodiment has a generally "E"-shape, and includes a front side 20, a rear side 22, a first side 24, a second side 26, an upper portion 28 having a free end 30, a lower portion 32 having a free end 34, a longitudinal extension 36, a second extension 38, a third extension 40, a triangular-shaped cutout 42, a guiding cutout 44, a plurality of openings 46, 48, 50, a hook 52 protruding away from said rear side 22, and a plurality of pegs or bosses 54, 56, 58, 60 protruding away from said rear side 22. The upper portion 28 includes a top surface 29, a bottom surface 31, and a length of teeth 62 spaced with gaps 63 along the top surface 29 that is generally downwardly curved in configuration from the second side 26 to the first side 24. The lower portion 32 has a step down cutout 64 about the free end 34. The longitudinal extension 36 extends between the upper portion 28 and lower portion 32 proximate the second side 26.

The second extension 38 extends from below the midpoint of the longitudinal extension 36 toward the upper portion 28 proximate the first side 24 such that an attachment end 66 is defined. The third extension 40 has a top surface 41, and extends between the upper portion 28 proximate the second side 26 and the attachment end 66 of the second extension 38. The triangular-shaped cutout 42 is defined by the extensions 36, 38, 40. The guiding cutout 44 is defined by the upper portion 28, longitudinal extension 36, and third extension 40, and is generally downwardly curved in configuration from the second side 26 to the first side 24. The guiding cutout 44 is also generally downwardly curved in configuration at its first end 68 and second end 70 such that the ends 68, 70 and the free end 30 of the upper portion 28 help to keep the gear arm 12 and movable arm 14 movably engaged at all times with one another during movement of the hinge mechanism 10 between closed and open positions.

From about its second end 70 toward its first end 68, the guiding cutout 44 provides a guide member path or cam pathway with established and articulated-like movement between the two arms 20, 22, and also assures that the damper 16 does not jump the length of teeth 62 along the top surface 29 of the upper portion 28, when the hinge mechanism 10 is moved between the closed and open positions. The length of teeth 62 along the top surface 29 of the upper portion 28 provides a damper path on the upper portion 28 of the gear arm 12 for the damper 16 to interact with when the hinge mechanism 10 is moved between the closed and open positions.

The first opening 46 is positioned through the first boss 54 at the free end 30 of the upper portion 28 proximate the first side 24. The second opening 48 is positioned through the second boss 56 at or about the junction of the upper portion 28 and longitudinal extension 36 proximate the second side 26. The third opening 50 is positioned through the third boss 58 at or about the junction of the lower portion 32 and longitudinal extension 36 proximate the second side 26.

Each opening 46, 48, 50 is adapted for receiving attachment means (not shown), such as a screw or any known attachment means in the art, so as to allow the gear arm 12 to be securely attached or fixed, for example, to a side wall 74 of a box 72. The hook 52, which alternatively can be manufactured as a peg or boss, is positioned about the free end 34 of the lower portion 32 proximate the first side 24, and is adapted for engaging one of the ends of the compression spring 18.

The fourth boss 60 is positioned at or about the junction of the second extension 38 and longitudinal extension 36, and is adapted for engaging with the movable arm 14 during movement of the hinge mechanism 10 between the closed and open positions such that the movable arm 14 is able to rotate and translate while the gear arm 12 remains generally stable or fixed. The fourth boss 60 is the point of rotation of the movable arm 14. The step down cutout 64 about the free end 34 of the lower portion 32 allows the components of the hinge mechanism 10 to be assembled for generally unobstructed and smooth rotation during movement of the hinge mechanism 10 between the closed and open positions.

Figure 1:
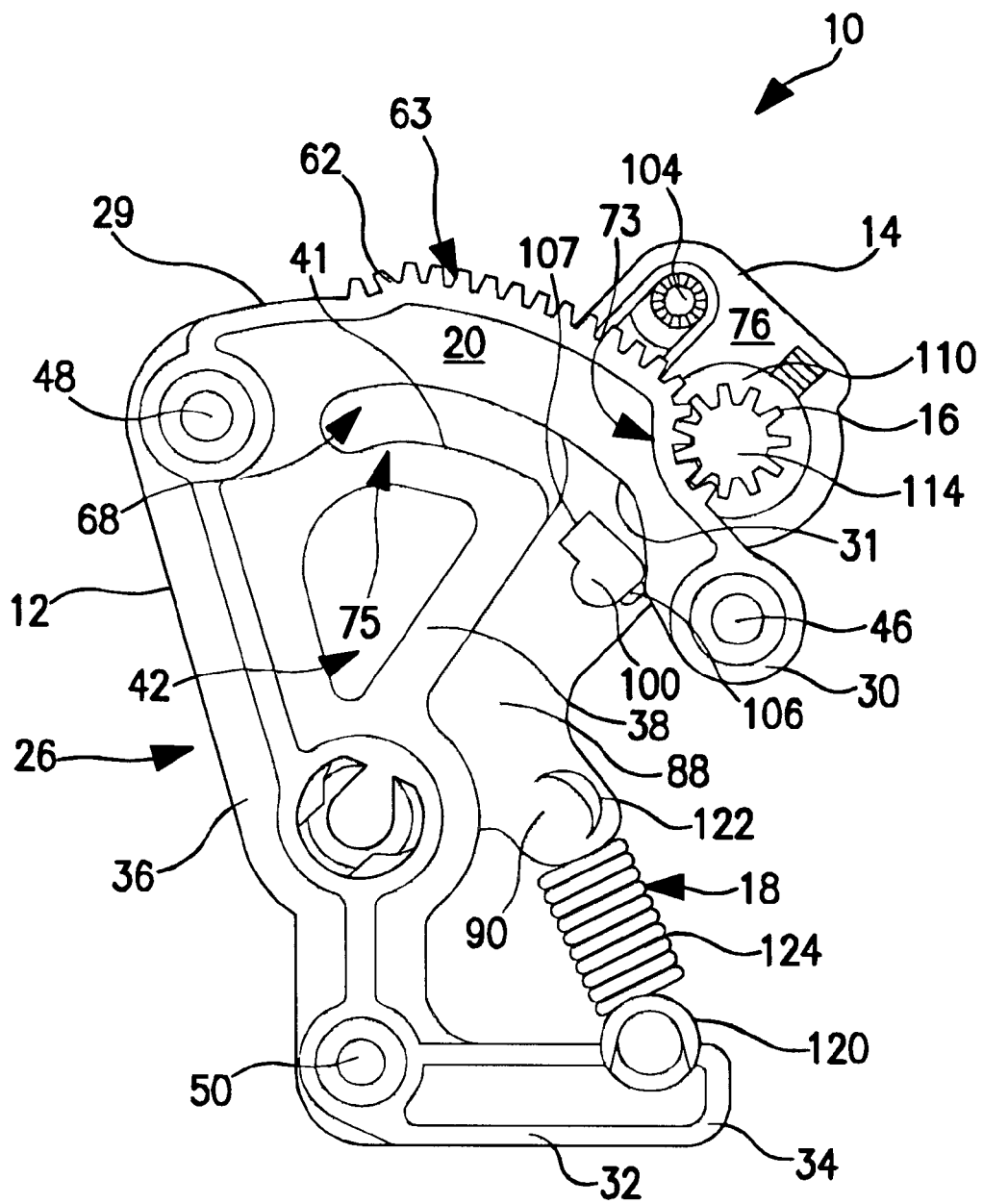
FIG. 1 is a front elevation view of a first embodiment of the detented and dampened hinge mechanism of the present invention, the hinge mechanism being shown in an open position.
Figure 2:
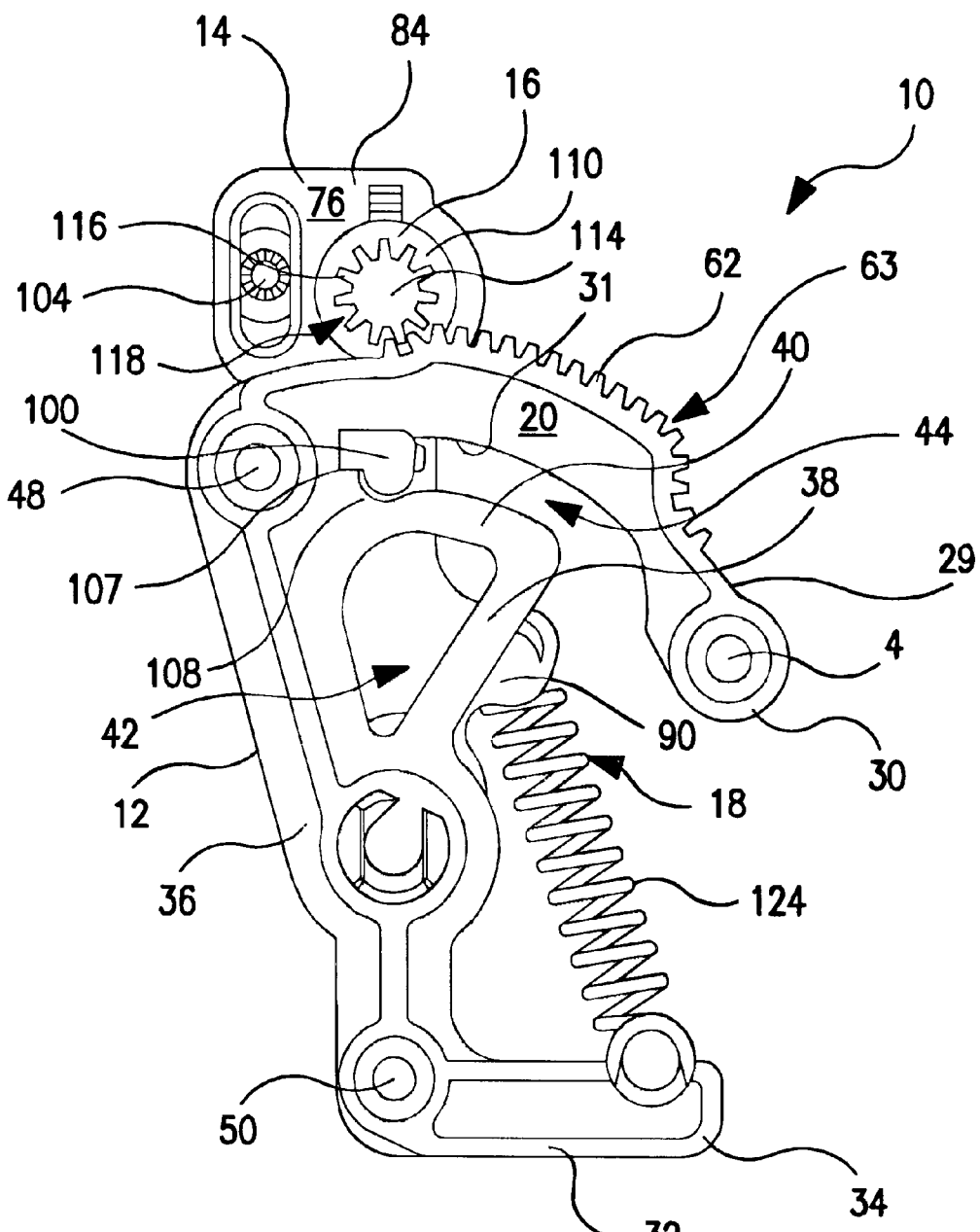
FIG. 2 is a front elevation view of the detented and dampened hinge mechanism of the present invention, the hinge mechanism being shown in a closed position.
Figure 3:
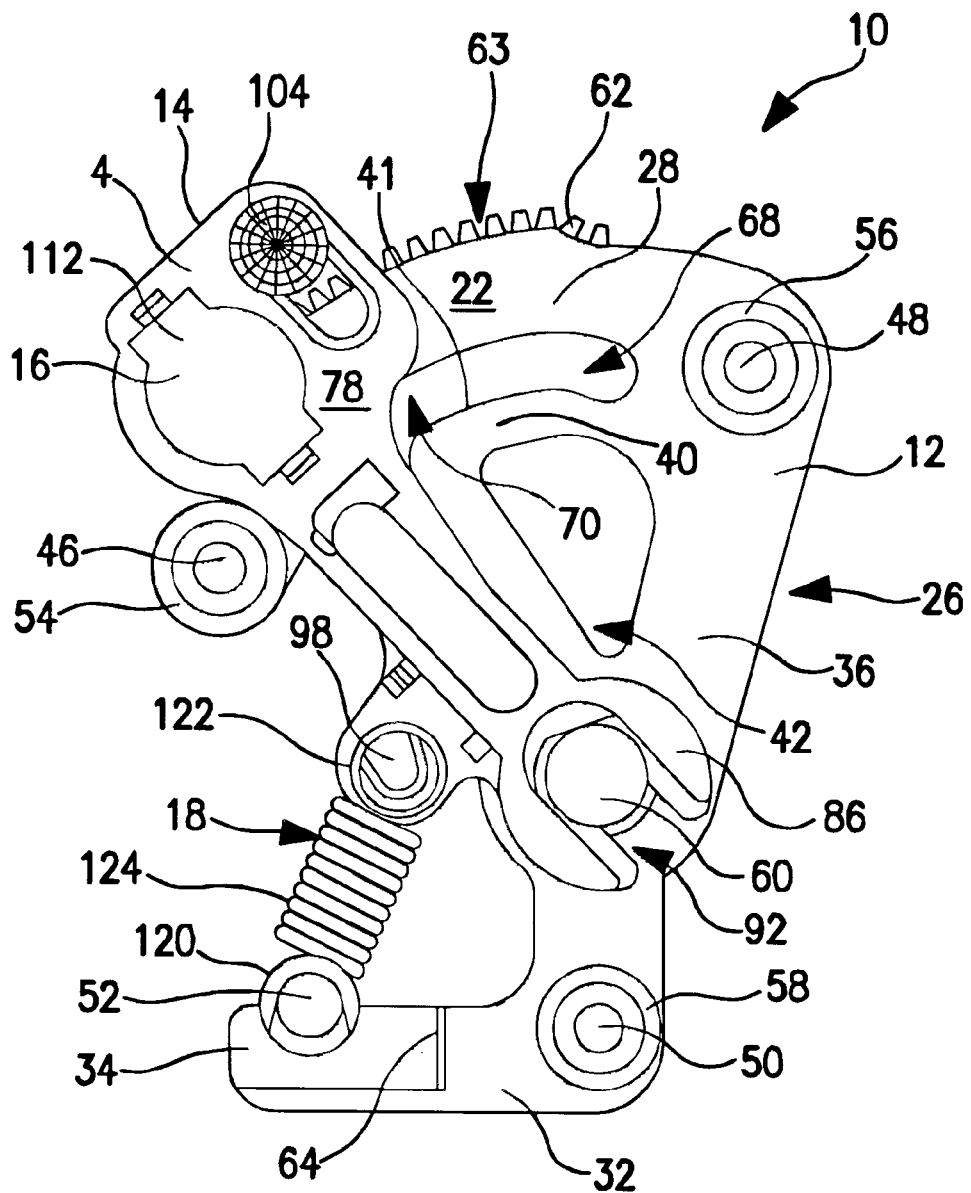
FIG. 3 is a rear elevation view of the detented and dampened hinge mechanism of the present invention, the hinge mechanism being shown in a closed position.
Figure 4:
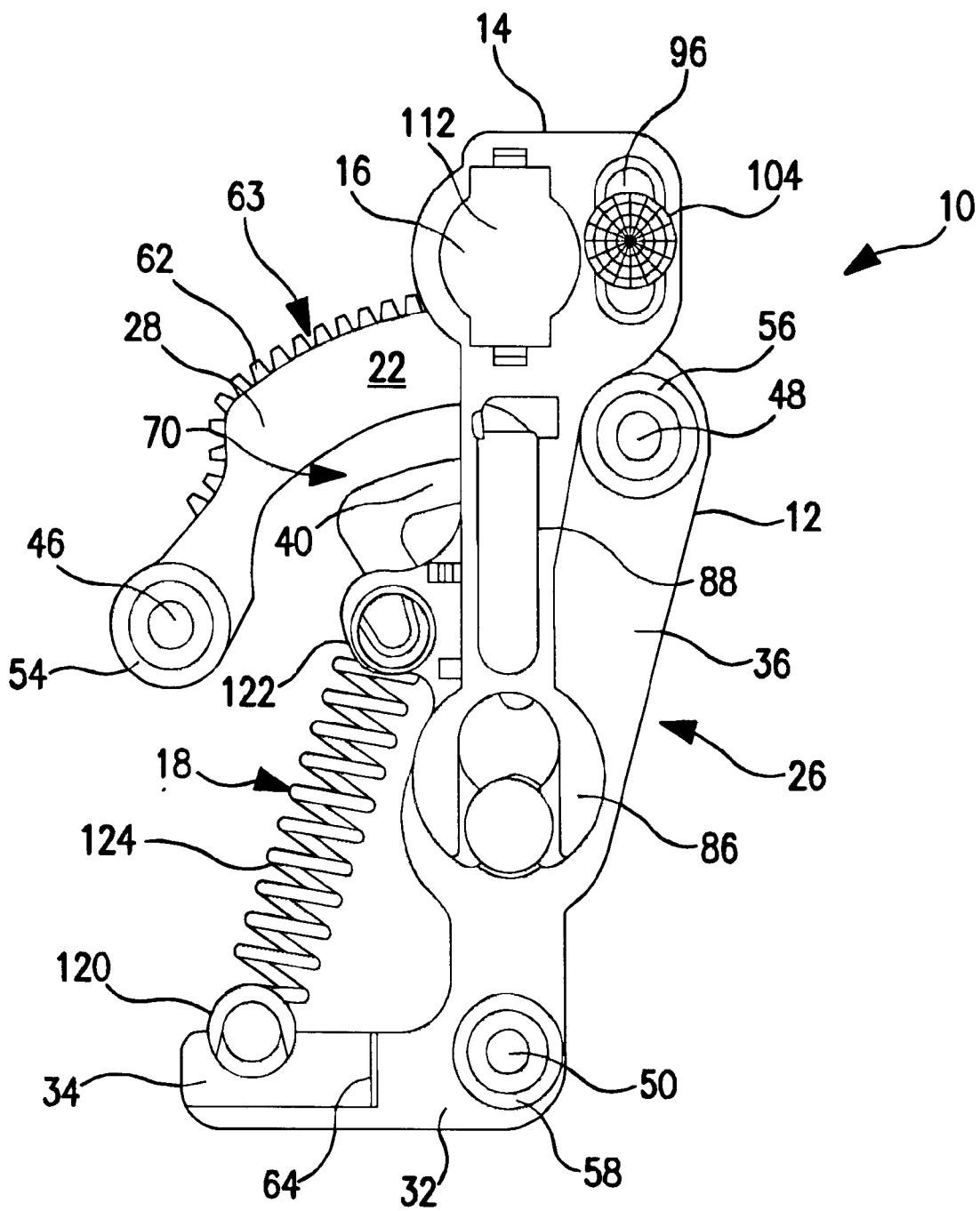
FIG. 4 is a rear view of an embodiment of a detented and dampened hinge mechanism in accordance with the present invention, the hinge mechanism being shown in an open position.
Figure 5:
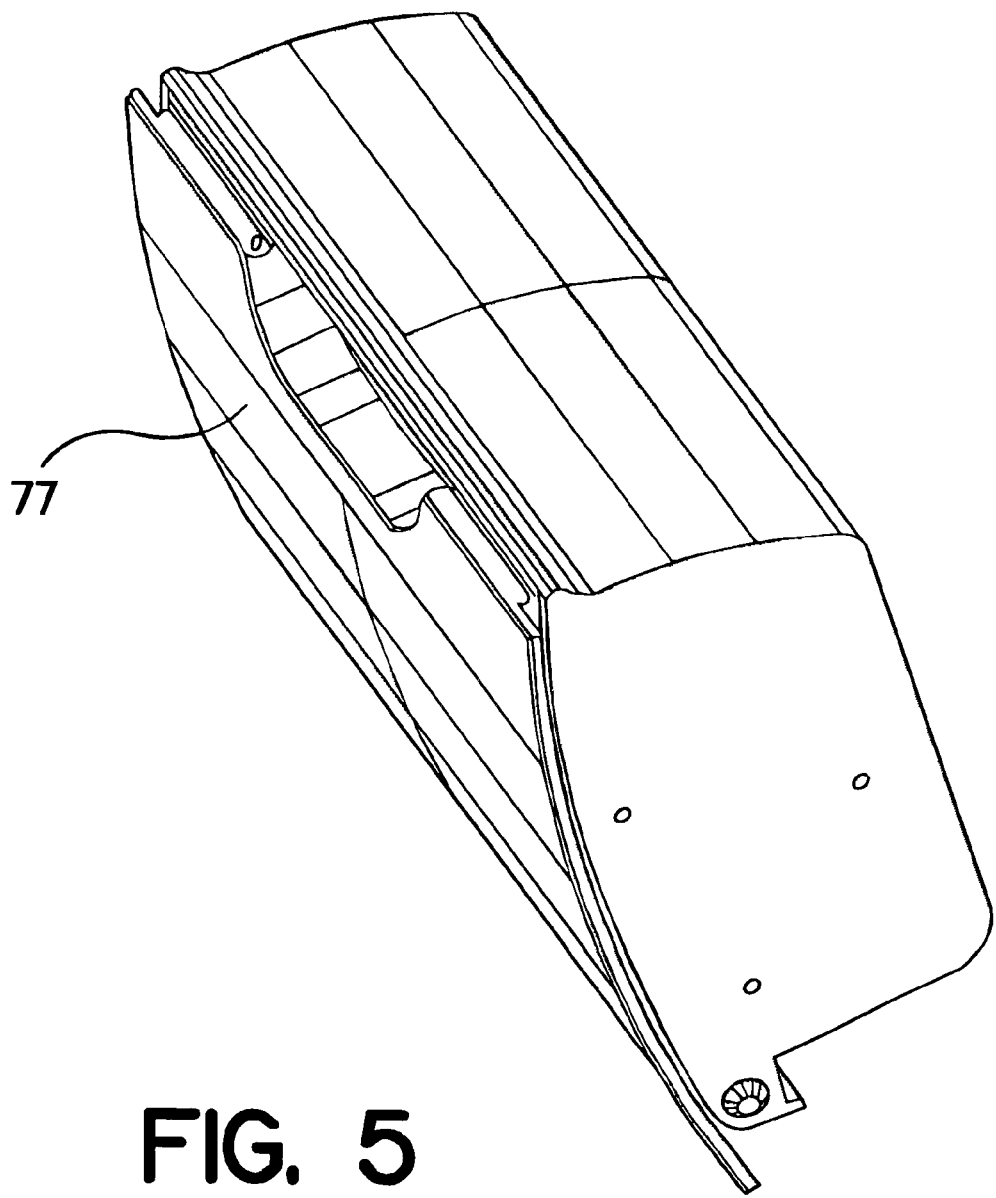
FIG. 5 is a perspective view of an enclosure or box, in the closed position, the door of this box being operated by the detented and dampened hinge mechanism of the present invention, hidden from view and attached within the structure.
Figure 6:
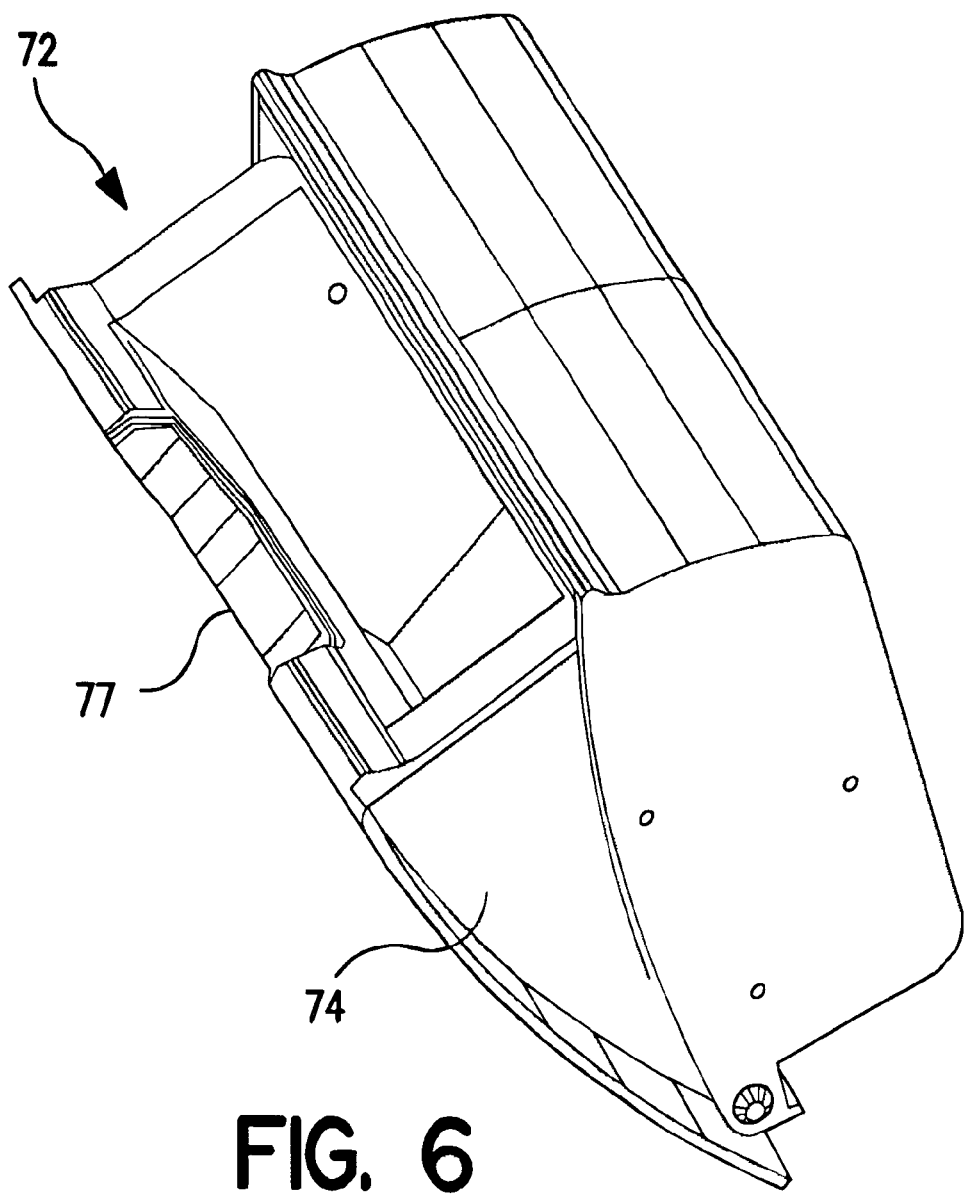
FIG. 6 is a perspective view of an enclosure or box, with an attached detented and dampened hinge mechanism within the structure, the box being shown in an open position.

At the closed position (as illustrated in FIG. 1) of the hinge mechanism 10, the gear arm 12 has an anti-gravity, first detent 73 along the length of teeth 62 about the first side 24 of the upper portion 28 such that a downward pull action from a user is required to place the hinge mechanism 10 in the open position. At the open position (as illustrated in FIG. 2) of the hinge mechanism 10, the gear arm 12 has a second detent 75 about the downwardly curved first end 68 of the guiding cutout 44, such that an upward push action from a user is required to place the hinge mechanism 10 into the closed position.

The movable arm 14 is illustrated in detail in FIGS. 16–20. The movable arm 14 in this embodiment includes a front side 76, a rear side 78, a first side 80, a second side 82, an upper portion 84, a lower portion 86, a longitudinal extension 88, a side extension 90, a gear arm-engaging cutout 92, a damper-engaging cutout 94, a third cutout 96, a hook 98 protruding from the rear side 78, and a guide member 100 protruding from the front side 76. The longitudinal extension 88 extends between the upper portion 84 and lower portion 86. The side extension 90 extends sidewardly from the first side 80 about the lower portion 86, and has a step down cutout 102. The step down cutout 102 of the side extension 90 allows the components of the hinge mechanism 10 to be assembled for generally unobstructed, smooth rotation during movement of the hinge mechanism 10 between the closed and open positions. The gear arm-engaging cutout 92 is adapted for accommodating and movably engaging with the fourth boss 60 of the gear arm 12 during movement of the hinge mechanism 10 between the closed and open positions. The damper-engaging cutout 94 is adapted for receiving and securing the damper 16. The third cutout 96 is adapted for receiving attachment means, such as a screw 104 or any known attachment means in the art, so as to allow the movable arm 14 to be movably attached or secured to the side wall 74 of the box 72.

The hook 98, which alternatively can be manufactured as a peg or boss, is positioned on the side extension 90, and is adapted for engaging the second end of the compression spring 18. The guide member 100 has a top surface 105, a first side surface 106, a second side surface 107, and a bottom surface 108, and is adapted to move and slide within the guiding cutout 44 of the gear arm 12. When the hinge assembly 10 is moved between the closed and open positions, the bottom surface 108 of the guide member 100 makes contact with the top surface 41 of the third extension 40 of the gear arm 12, and thus takes the load off of the damper 16 to allow generally smooth and controlled closing speed. When the hinge assembly 10 is moved from the open position to the closed position, the first side surface 106 of the guide member 100 makes contact with the bottom surface 31 of the upper portion 28 of the gear arm 12 and prevents the damper 16 from jumping the teeth 62 of the gear arm 12.

The damper 16 is illustrated in FIGS. 14 and 7–10. The damper 16 in this embodiment has a generally circular shape, and includes a front side 110 and a rear side 112. The front side 110 of the damper 16 has a generally centrally located pinion gear wheel 114 having teeth 116 spaced with gaps 118 along the circumference of the pinion gear wheel 114. The damper 16 is adapted to be attached securely within the damper-engaging cutout 94 of the movable arm 14.

When the hinge mechanism 10 is moved between the closed and open positions, the teeth 62 and gaps 63 of the gear arm 12 are adapted to engage with the gaps 118 and teeth 116 of the pinion gear wheel 114.

The compression spring 18 is illustrated in FIGS. 1–4 and 7–10. The compression spring 18 in this embodiment has a first end 120, a second end 122, and a compressible spring body 124 extending between the ends 120, 122. The first end 120 is adapted for engaging with the hook 52 of the gear arm 12, while the second end 122 is adapted for engaging with the hook 98 of the movable arm 14.

The gear arm 12, movable arm 14, and damper 16 in the present embodiment are preferably made from reinforced nylon, however, it should be understood that other materials and/or manufacturing processes can also be utilized for the same purpose.

Figure 21:
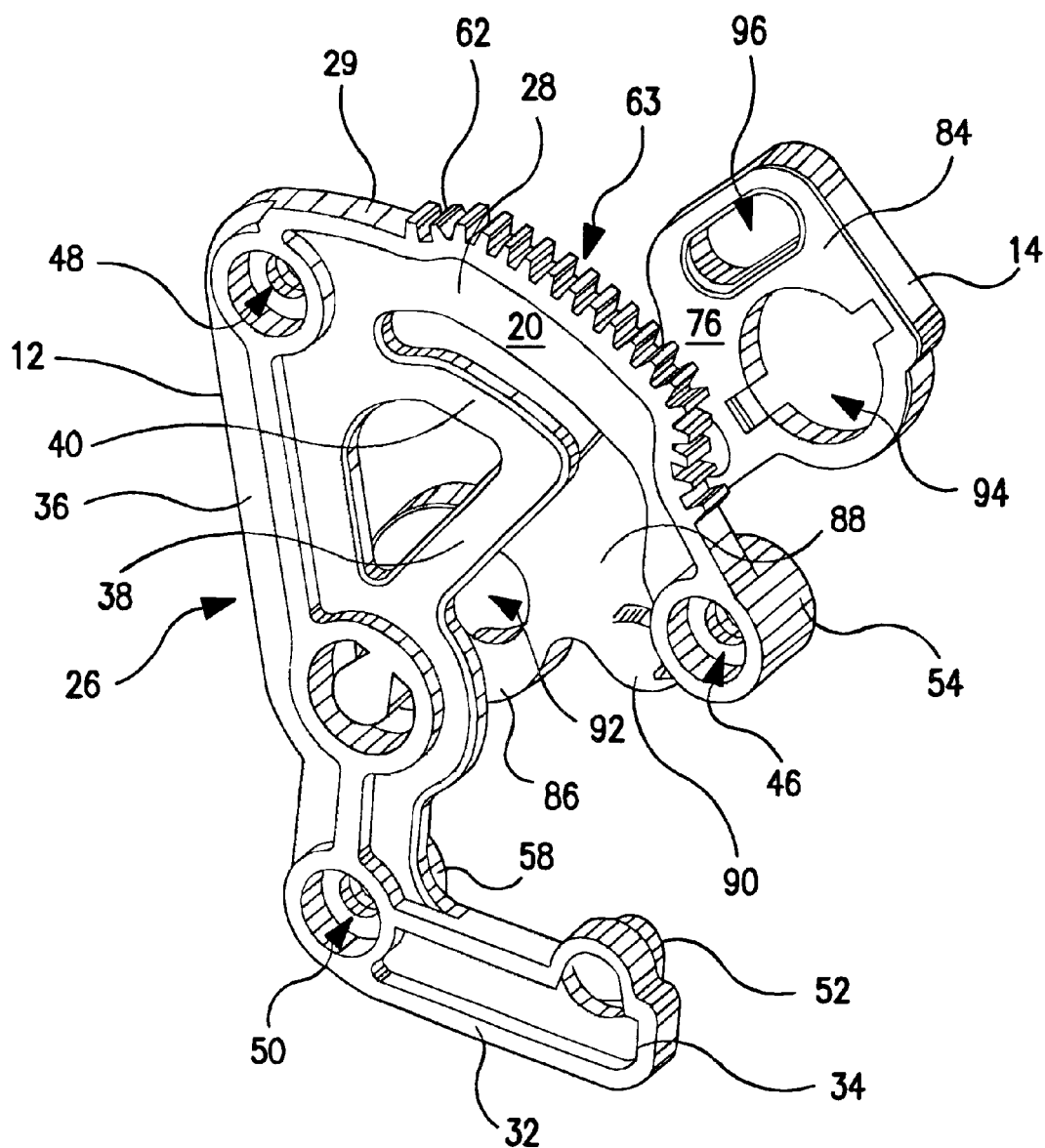
FIG. 21 is a perspective view of the detented and dampened hinge mechanism of FIG. 1 with the fixed gear arm and the movable arm being in a first assembly position.
Figure 22:
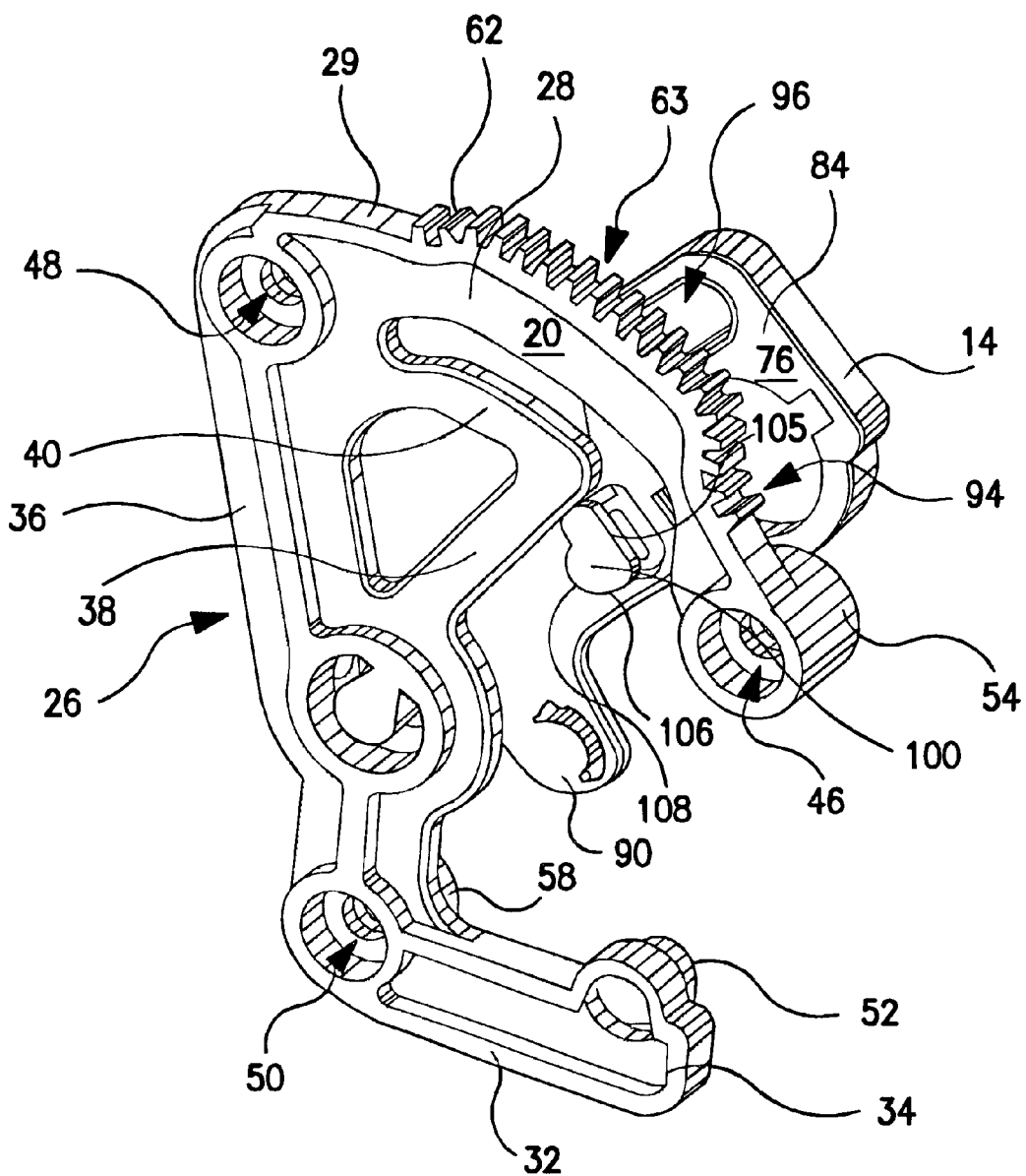
FIG. 22 is a perspective view of the detented and dampened hinge mechanism of FIG. 1 with the fixed gear arm and the movable arm being in a second assembly position.

The assembly of the hinge mechanism 10 will now be described. As illustrated in FIG. 21, the movable arm 14 is prepared to be attached to the gear arm 12 by placing the movable arm 14 above the gear arm 12 at about the closed position such that the gear-arm engaging cutout 92 of the movable arm 14 is above and proximate the fourth boss 60 of the gear arm 12. As illustrated in FIG. 22, the movable arm 14 can then be pushed downwardly in place relative to the gear arm 12 such that the gear-arm engaging cutout 92 engages with the fourth boss 60, and the second side surface 107 of the guide member 100 is proximate the attachment end 66 of the second extension 38.

Figure 23:
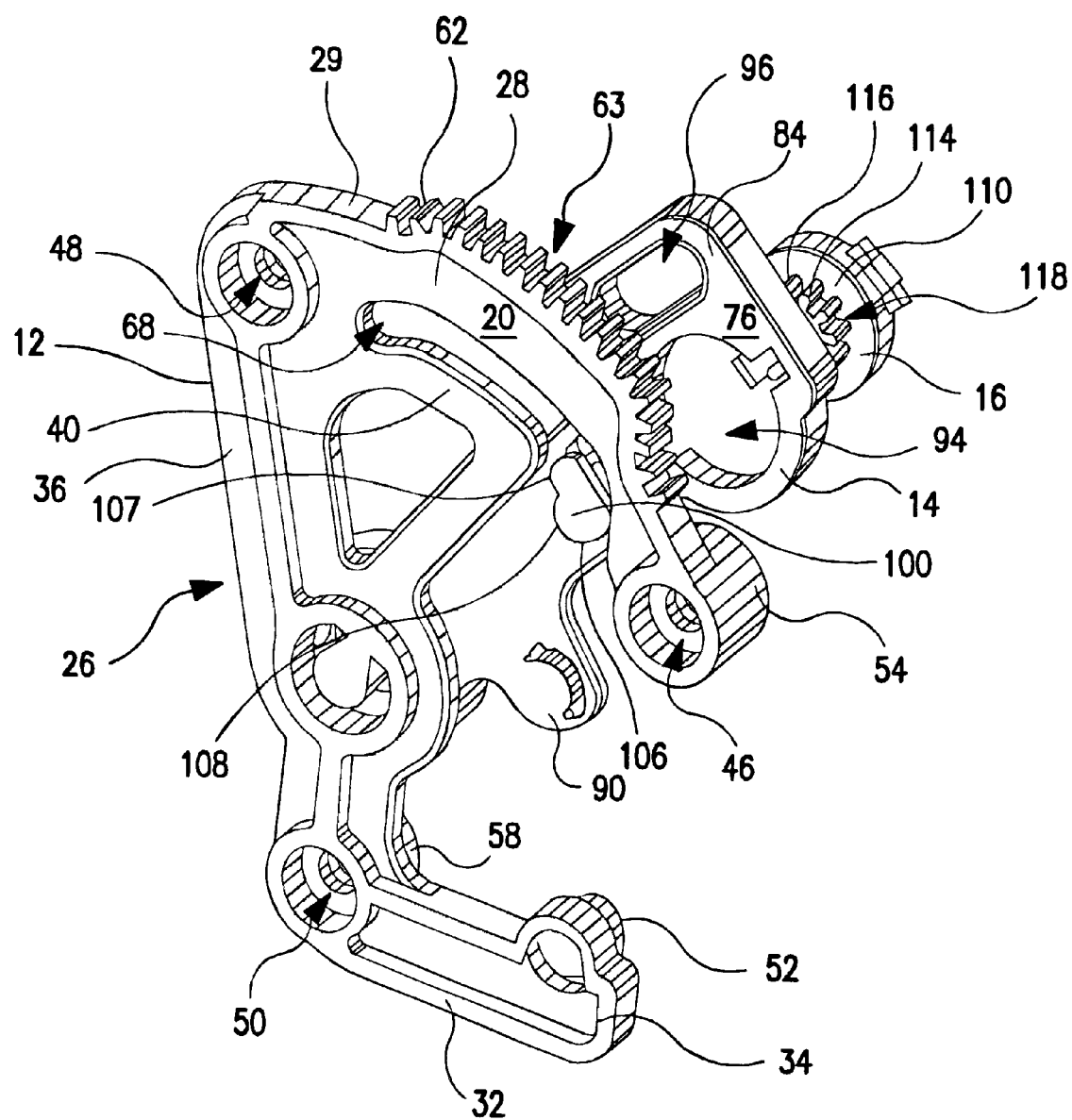
FIG. 23 is a perspective view of the detented and dampened hinge mechanism of FIG. 1 with the fixed gear arm, the movable arm, and the damper being shown in a third assembly position.
Figure 24:
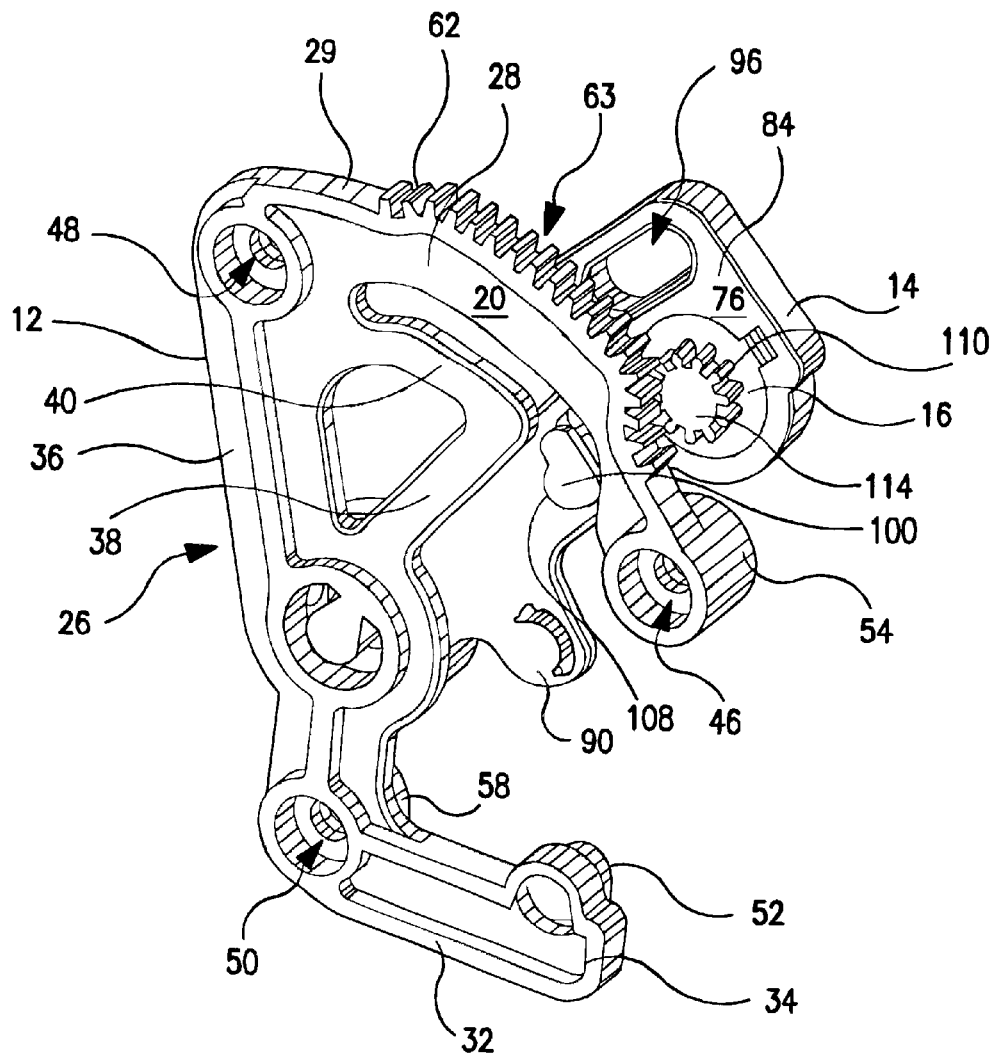
FIG. 24 is a perspective view of the detented and dampened hinge mechanism of FIG. 1 with the gear arm, the movable arm, and the damper being shown in a fourth assembly position.
Figure 25:
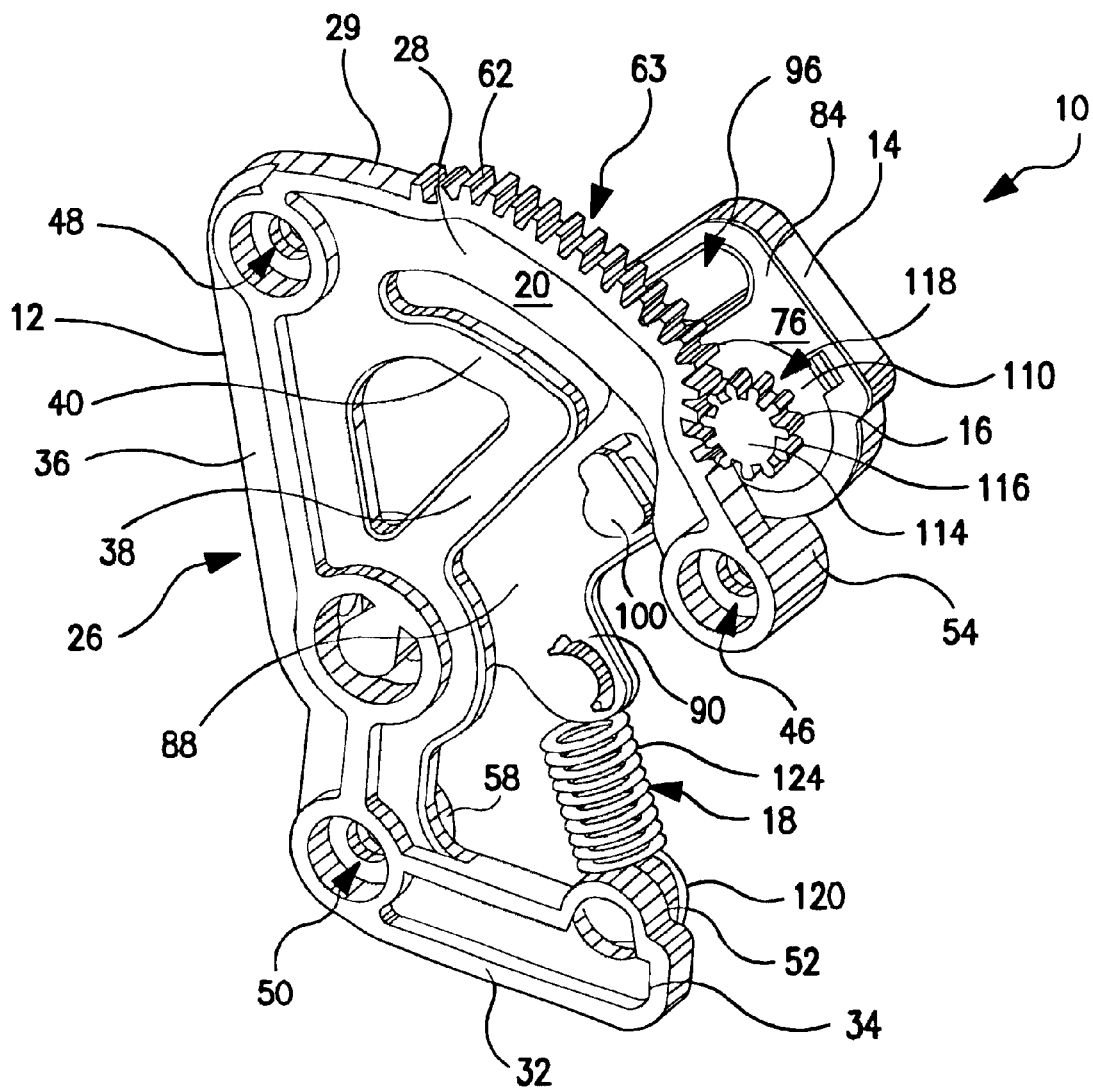
FIG. 25 is a perspective view of the detented and dampened hinge mechanism of FIG. 1 with the gear arm, the movable arm, the damper, and the biasing spring being shown in a fifth assembly position.
Figure 26:
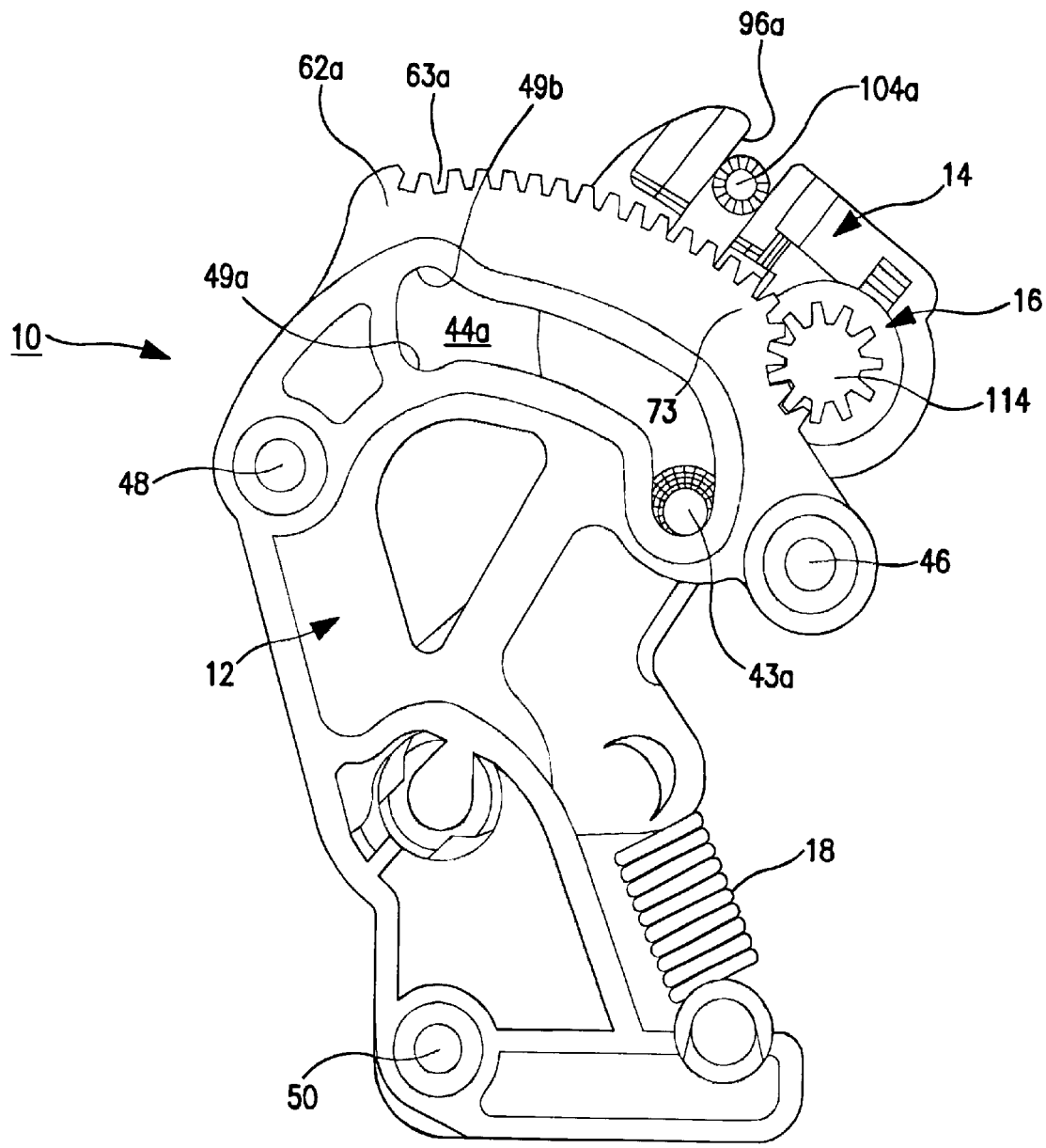
FIG. 26 is a front elevation view of an alternate embodiment of a scissor arm assembly in accordance with the present invention, the scissor arm being shown in an open position.
Figure 27:
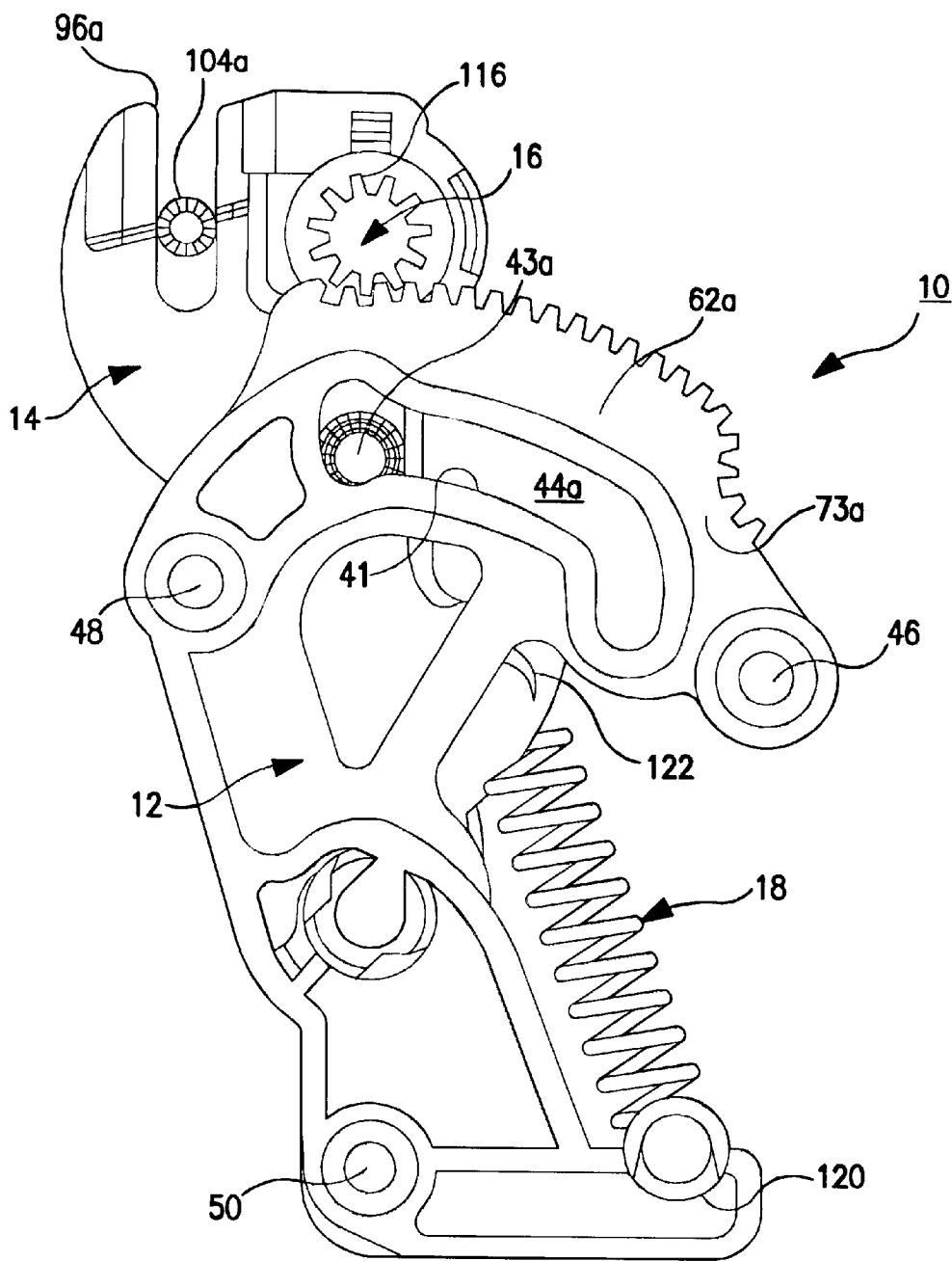
FIG. 27 is a front elevation view of the scissor arm assembly of FIG. 26 in the closed position.
Figure 28:
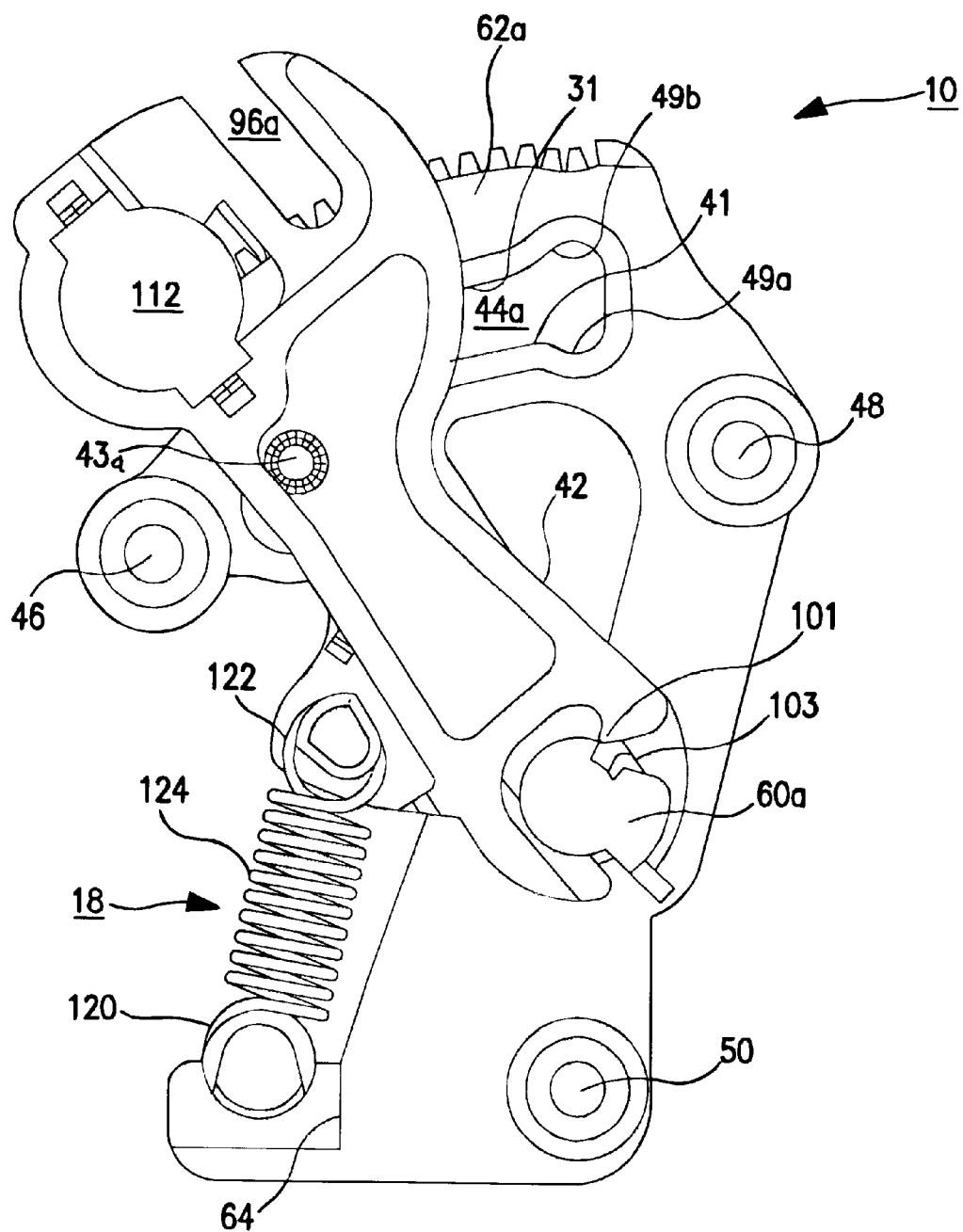
FIG. 28 is a rear elevation view of the scissor arm assembly of FIG. 26 in the open position.
Figure 29:
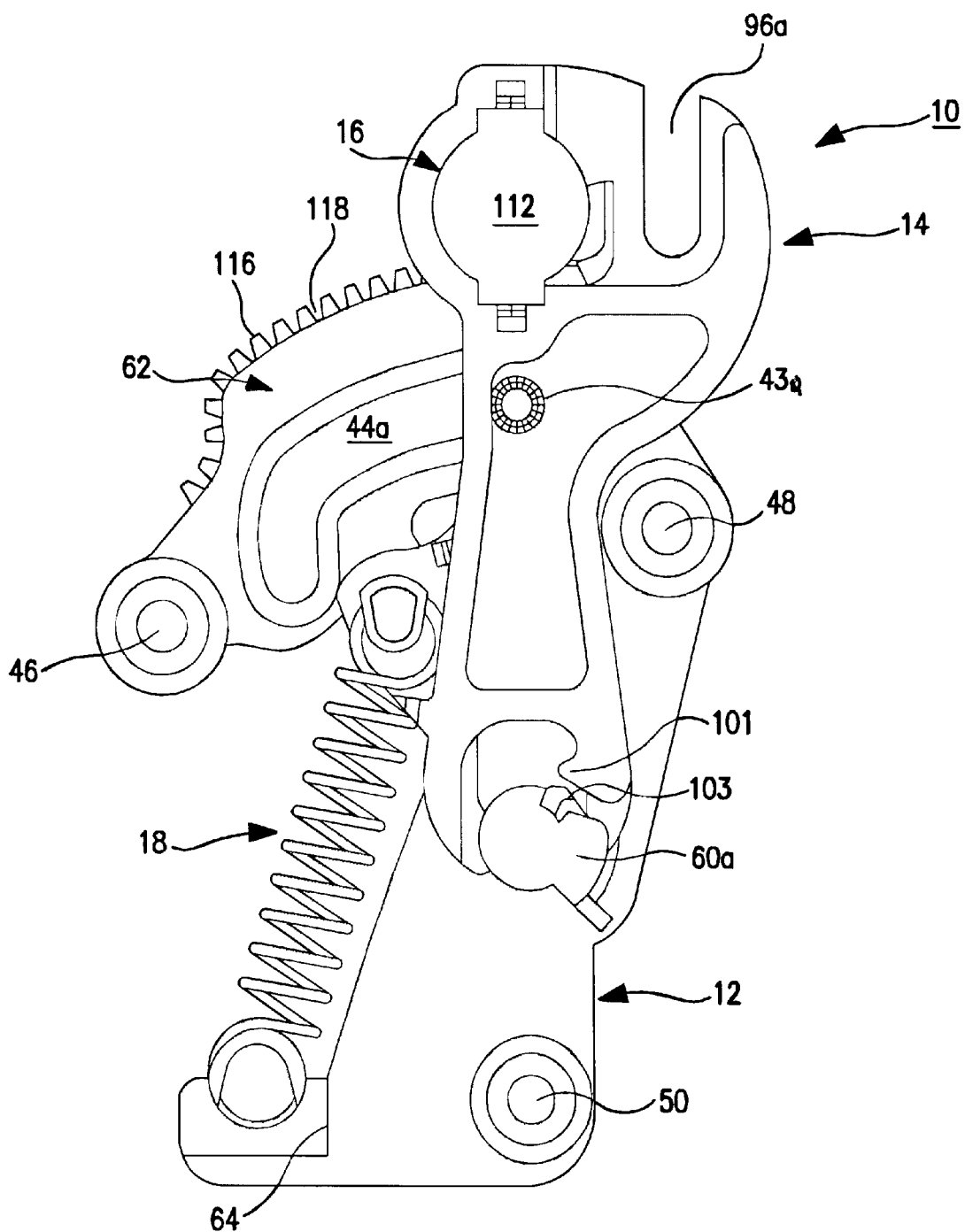
FIG. 29 is a rear elevation view of the scissor arm assembly of FIG. 27.
Figure 30:
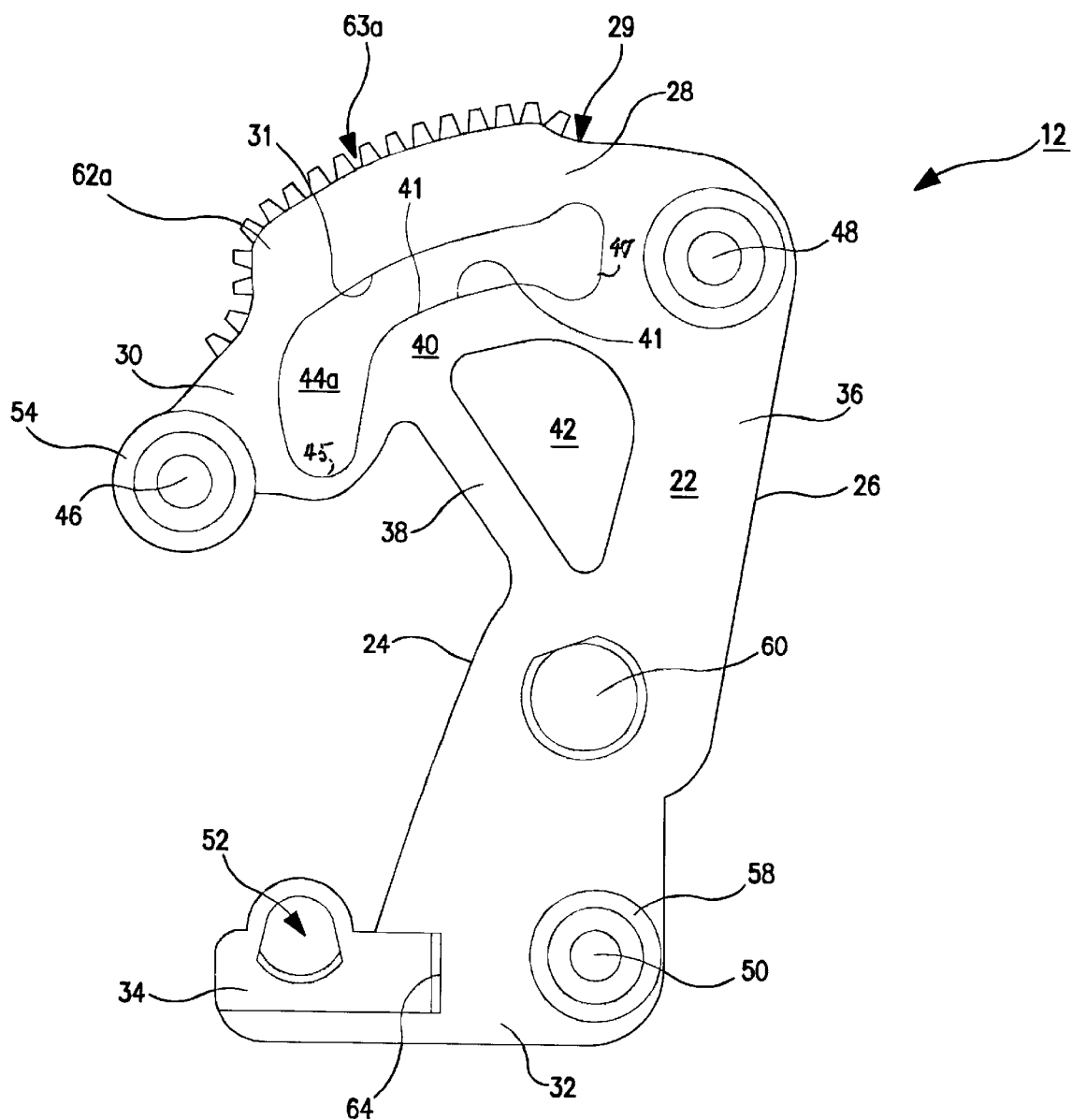
FIG. 30 is rear elevation view of the fixed arm of the assembly of FIG. 26.
Figure 31:
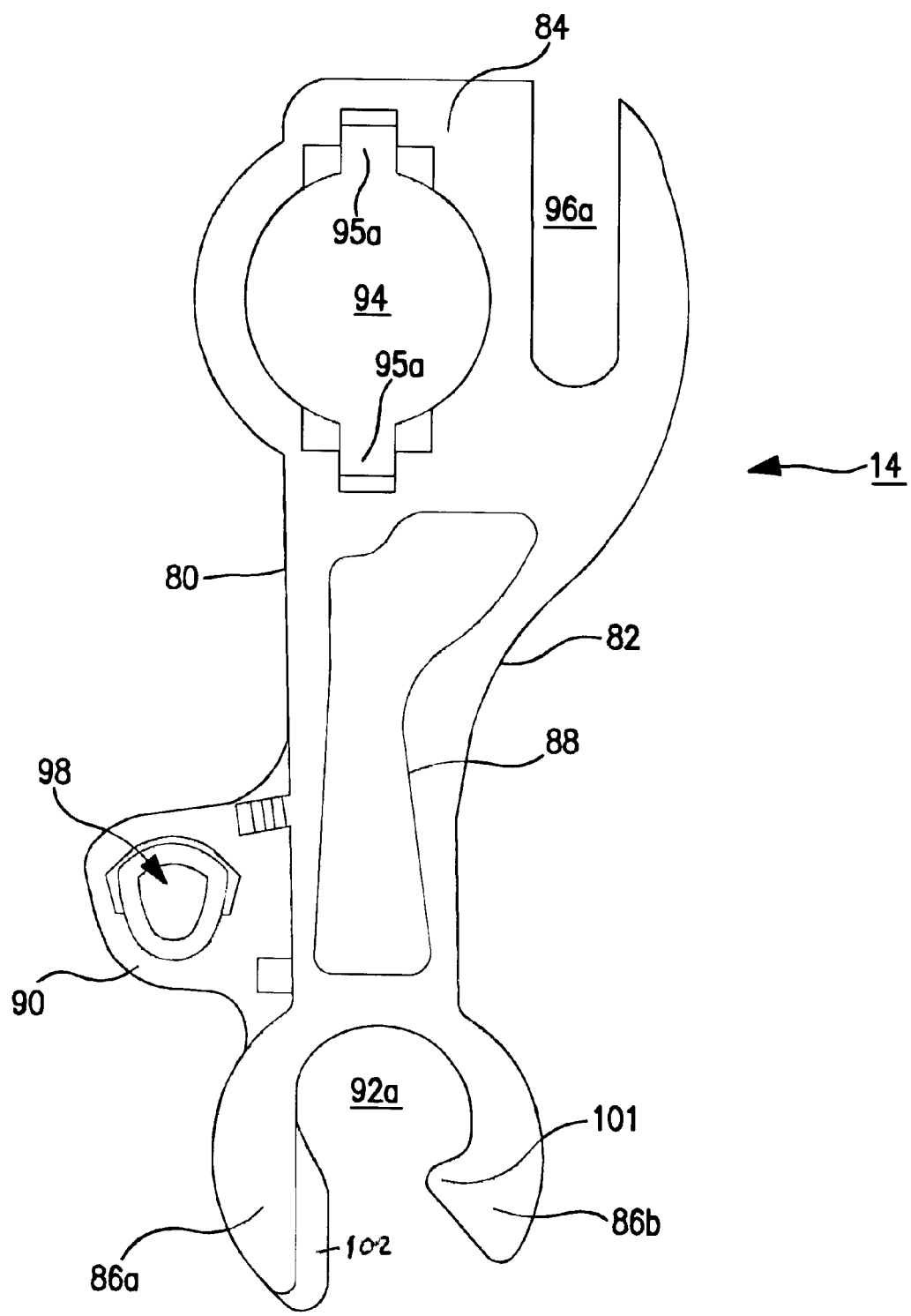
FIG. 31 is a rear elevational view of the movable arm of the assembly of FIG. 26.
Figure 32:
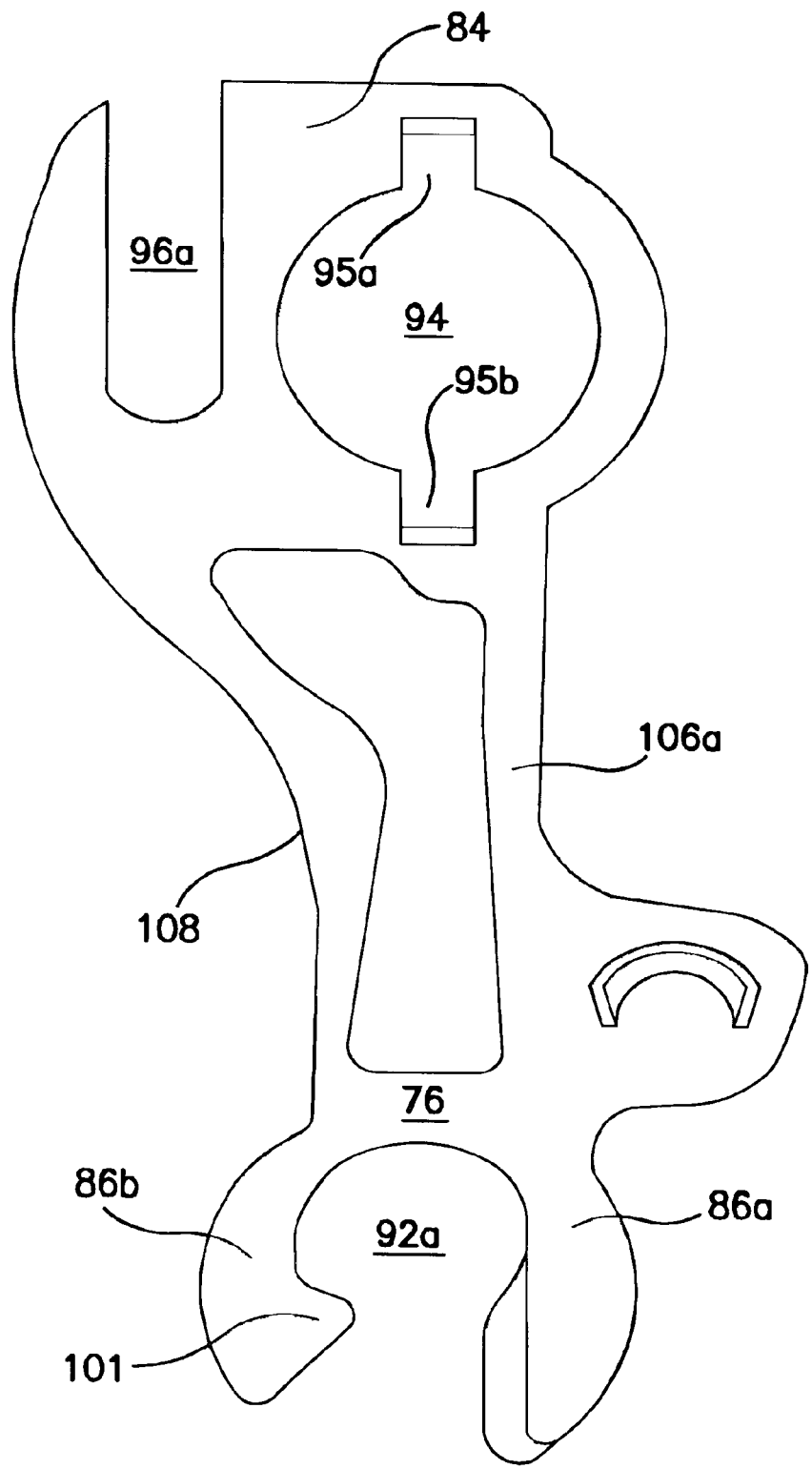
FIG. 32 is a front elevation view of the movable arm of FIG. 31.

As illustrated in FIG. 23, the movable arm 14 can then be lifted upwardly so that the guide member 100 engages with the gear arm 12 and there is enough clearance to snap the damper 16 into the damper-engaging cutout 94 of the movable arm 14. As illustrated in FIG. 24, the damper 16 can now be snapped into the damper-engaging cutout 94 such that the teeth 62 and gaps 63 of the gear arm 12 are releasably engaged with the gaps 118 and teeth 116 of the pinion gear wheel 114 of the damper 16, and that the gear arm 12 and movable arm 14 are engaged with one another via the damper 16 and fourth boss 60. As illustrated in FIG. 25, the spring 18 is fitted between the hooks 52, 98 of the arms 12, 14 such that the first end 120 of the spring 18 is engaged with the hook 52, while the second end 122 of the spring 18 is engaged with the hook 98. Other types of biasing means can also be used for the same purpose, such as a torsion spring or an elastomeric spring, among others. It is preferred that the damper 16 is of the rotary type having the pinion gear wheel 114. Such types of dampers are commercially available and use a thick viscous substance to dampen the rotation of the gear wheel 114. Also, friction clutches may be used to dampen the rotation of the gear wheel 114. Damping the pivotal movement of the movable arm 14 relative to the gear arm 12 is advantageous in that it allows the hinge mechanism 10 to open in a slow and controlled manner so as not to startle or injure a user.

The operation of the hinge mechanism 10 of the present embodiment will now be described. The hinge mechanism 10 is adapted for any of a number of different applications, such as to secure one member relative to another member, for example, pop-out trays, sliding ashtrays and the like. An example of how the hinge mechanism 10 of the present embodiment can be applied is illustrated in FIGS. 7–10. As the box is pulled to open by a user, the driving force is transmitted to the movable arm 14 via a boss feature on the side wall 74 of the box 72. This boss (not shown) can be a molded feature of the box 72, or can be an added nylon pin (not shown) to improve strength and wear resistance. The pin is engaged into the gear-arm engaging cutout 92 of the movable arm 14 and, as the box 72 rotates around its axis, the pin pulls the movable arm 14. The pin rotates around the axis of the movable arm 14 and, as the damper path on the gear arm 12 provides for the first detent 73 in the closed position, the movable arm 14, besides rotating, also translates to get out of the first detent 73.

While the movable arm 14 rotates and slides and the damper 16 follows along the damper path, the tension on the spring 18 increases and, should the pulling action on the box 72 stop before reaching the second detent 75, the movable arm 14 moves back to its original stable position at the first detent 73. The anti-gravity feature relies on the orientation of the movable arm 14 in the closed position along with the depth of the first detent 73. When the door 77 of the box 72 is slammed shut, the moving arm 14 must work against gravity to get out of the first detent 73, which is generally unlikely. About one-third of the way between the closed and open positions, the moving arm 14 gets additional support to relieve the tension between the damper 16 and the guide member path. This extra support will make the movable arm 14 close generally smoothly, instead of having a "notchy" behavior, which is boosted when the spring tension increases. At the end of the travel along the guide member path, in the open position, the moving arm 14 goes down into the second detent 75. The second detent 75 is preferably not as deep as the first detent 73 to allow the movable arm 14 to get out of the second detent 75 easily with a light push on the lid 77 of the box 72.

When closing, the speed of the moving arm 14 is controlled by the damper 16. The vertical tension of the spring 18 prevents the damper 16 from jumping out of the damper path and the horizontal tension of the spring 18 maintains the momentum of the moving arm 14. As the moving arm 14 approaches the closed position, the vertical spring tension decreases and, to keep the damper 16 on the damper path, the moving arm 14 is guided. The guide member 100 is used to keep the two arms 12, 14 engaged to each other throughout the opening and closing processes.

The damper path can be modified to suit specific applications and the spring type and damper type combination can be chosen to suit. The relative position of the rotational axis of the moving arm 14, with the rotational axis of the box 72, generally gives a specific opening angle. If the two axis are collinear, then the box 72 will open at about 45 degrees. If the hinge mechanism 10 is placed above the rotational axis of the box 72, then the opening angle will be generally less than about 45 degrees. If the hinge mechanism 10 is placed below the rotational axis of the box 72, then the opening angle will be generally greater than 45 degrees.

In possible applications, front door boxes are placed above the rotational axis of the box 72 to generally give about a 24 degrees opening angle, and rear door boxes are placed a bit higher than the front door boxes to generally give about a 20 degrees opening angle. The gear arm 12 can also be mounted on the left and right doors as the gear arm 12 can be securely attached or fixed to the side wall 74 from the right or the left via the three openings 46, 48, 50. The box boss or nylon pin can also engage into the gear arm-engaging cutout 92 from the right or the left. The gear arm 12 may be secured to the side wall 74 with three M4 screws or any well known fasteners in the art.

A second or alternate embodiment of the scissor arm hinge mechanism 10 is shown in FIGS. 26–32 includes first and second arms 12 and 14, respectively, comprising a gear arm 12 and a movable arm 14, a damper 16, and closed position biasing coil spring 18. The discussion below with respect to this alternate embodiment will focus on the modifications to the first embodiment. It is understood that the remainder of the description of the first embodiment applies to the second embodiment as well.

The gear arm 12 is generally dog-leg shaped, and includes a front side 20, a rear side 22, a first side edge 24, a second side edge 26, an upper portion member 28 having a free end 30, a lower portion member 32 having a free end 34, a first longitudinal extension member 36, a second extension member 38, a third longitudinal extension member 40. The gear arm 12 also has a triangular-shaped cutout 42, a guide way cutout 44a which acts as a cam guide way, and a plurality of circular pin receiving openings 46, 48, 50 as before. A plurality of bosses protrude away from the rear side 22, one each about each respective pin receiving opening 46, 48, 50. A pivot shaft 60a also protrudes away from the rear side.

The upper portion member 28 of gear arm 12, includes a top surface edge 29 and a bottom surface edge 31 abutting the guide way cut out 44a. A track length of gear teeth 62a with spacing gaps 63a extends along the top surface edge 29 at a location intermediate the pin receiving openings 46, 48. This track length of gear teeth 62a dips downwardly in a curved manner as it approaches the pin receiving opening 46 side of the upper portion member 28. The lower portion member 32 has a step down cutout 64 about the free end 34 on its rear side 22. The longitudinal extension member 36 extends between the upper portion 28 and lower portion 32 proximate the second side edge 26. The second extension member 38 extends from below the midpoint of the longitudinal extension member 36 toward the upper portion member 28 proximate the first side edge 24 such that an attachment end 66 is defined. The third extension member 40 has a top surface edge 41 which helps define the guideway cut out 44a, and extends adjacent the upper portion member 28 proximate the receiving pin opening 46 to the receiving pin opening 48.

The triangular-shaped cutout 42 is defined by the extensions 36, 38, 40. The guidway cut out 44a acts as a pin slot for the guide pin 43a. This pin slot 44a is a curved channel with a dog leg first receiving slot end 45, extending downwardly at its end adjacent receiving opening 46, when the hinge mechanism 10 movable arm is scissors open. This receiving slot end 45 functions as a detent. The pin slot 44a has its opposite end 47 having dual concave depressions 49a, 49b, extending downwardly and upwardly, respectively, for holding the guide pin 43a with a detent action, and thereby positioning the movable arm 14 fixed, when the hinge mechanism 10 is scissors closed. The opening 88 in the movable arm 14 is boot-shaped and permits the free interaction of the guide pin 43a and the guide way (pin slot) 44a.

Another purpose of the pin slot 44a is to keep the guide member gear wheel 114 in constant contact with the gear track length 62a teeth 116. The length of teeth 62a along the top surface 29 of the upper portion 28 provides a damper path on the upper portion 28 of the gear arm 12 for the damper 16 to interact with when the hinge mechanism 10 is moved between the closed and open positions.

Each opening 46, 48, 50 is adapted for receiving attachment means, such as a screw or pin or any known attachment means in the art, so as to allow the gear arm 12 to be securely attached.

The step down cutout 64 about the free end 34 of the lower portion 32 allows the components of the hinge mechanism 10 to be assembled for generally unobstructed, smooth rotation during movement of the hinge mechanism 10 between the closed and open positions.

At the closed position of the hinge mechanism 10 the gear arm 12 the downward curve 73 of the gear track length 62a, proximate the pin, receiving opening 46 functions as an anti-gravity detent.

At the open position, the coil spring 18 is under tension and the hinge mechanism is held in a stable position by the detent cooperation between the guide pin 43a and the guide way cut out 44a downward extending concave depression 49a. The user must push the attached box 72 (FIGS. 5, 6) inward which causes it to move slightly upward as it leaves the detent position 49a of the guide way cut out 44a in order to move the hinge mechanism 10 into the closed position.

To assist the mechanism to hold the closed detent position when the spring 18 is not under tension, a hook 101 cooperates with a rectangular detent 103 in the fourth boss 60a. The movable arm 14 includes a front side 76, a rear side 78, a first side edge 80, a second opposite side edge 82, and upper member 84, and a lower member 86 (86a and 86b).

A cut out 92a in the lower member 86, is essentially circular having tabs 86a and 86b surrounding the circular opening 92a. The second tab 86b proximate the second side edge 82 carries the inwardly projecting hook 101 that engages the fourth boss 60a rectangular detent 103.

An elongate slot 96a extends downwardly from the top edge of the upper member 84 adjacent the circular socket 94. This slot receives a pin or screw 104a fixed to the box 72. The screw 104a acts with the slot 96a as a guide way for a slight reciprocating motion or articulation of the movable arm 14. The screw 104a has a head sufficiently large to hold the box 72 wall 74 (FIG. 6) to the movable arm 14. When the arm 14 moves, the box 72 is moved.

The lower portion member 86a, and has a step down 102 which allows the the back side of the boss 60a to overlap it and maintain the lower end of the movable arm 14 from jumping out of its pivot as it rotates. The gear arm-engaging cutout 92a is adapted for accommodating and movably engaging with the fourth boss 60a of the gear arm 12 during movement of the hinge mechanism 10 between the closed and open positions. The open slot 96a permits a lower profile for the upper member 84 and greater clearances for the operation of the hinge mechanism 10.

The operation of this alternate embodiment of the hinge mechanism 10 is very similar to the first embodiment. As the box is pulled to open by a user, the driving force is transmitted to the movable arm 14 via a boss feature on the side wall 74 of the box 72. The pin rotates around the axis of the movable arm 14 and, as the damper path on the gear arm 12 provides for the first detent 73 in the closed position, the movable arm 14, besides rotating, also translates to get out of the first detent 73. While the movable arm 14 rotates and slides and the damper 16 follows along the damper path, the tension on the spring 18 increases and, should the pulling action on the box 72 stop before reaching the second detent 75, the movable arm 14 moves back to its original stable position at the first detent 73. The anti-gravity feature relies on the orientation of the movable arm 14 in the closed position along with the depth of the first detent 73. When the door 77 of the box 72 is slammed shut, the moving arm 14 must work against gravity to get out of the first detent 73, which is generally unlikely.

The running path of the guide way 44a is fully enclosed to provide support all the way from the closed position to the open position. By doing so, in the closed position, the damper 16 is not under static load and therefore will not creep or break over a period of time. The hook 101 in the lower member 86a and 86b of the movable arm 14 co-acts with the detent 103 in the fourth boss 60a to provide an added detent function which prevents the box from flying open as the spring 18 is in a relaxed state.

Many changes can be made in the above-described invention without departing from the intent and scope thereof. It is intended thereby that the above description be read in the illustrative sense and not in the limiting sense. Substitutions, modifications, changes and adaptations can be made without departing from the intent and scope of the invention.

What is claimed:

1. A scissor-type arm hinge mechanism for opening and closing a swinging structure, with a push-pull and pull-push operation, comprising:
    a first fixed arm mounted to a fixture;
    a second movable arm pivotally connected to said first arm, said second arm being connectable to said swinging structure thereby moving it when said second arm is pivoted between open and closed positions;
    a curvilinear guide way in one of said arms for defining the arc swing of the movable arm with respect to the fixed arm;
    a cam follower guide member extending from a face of the other of said arms and into said curvilinear guide way to effect the arc swing;
    an articulation guide way in said second movable arm, extending in a direction which is radial to the arched path of said curvilinear guide way in said first fixed arm as said second movable arm pivots with respect thereto, said articulation guide way being engagable with a connection to said swinging structure; and
    means for biasing said first and second arms to a selected position.

2. The hinge mechanism of claim 1 also including means for controlling the rate of movement between said first and second arms when moving between open and closed positions.

3. The hinge mechanism of claim 2 wherein said biasing means biases said first and second arms to the open position.

4. The hinge mechanism of claim 3 wherein said rate of movement controlling means is a dampener.

5. The hinge mechanism of claim 4 also including:
    an elongated pivot journal in said movable arm;
    a mating pivot boss extending from said fixed arm through said pivot journal, wherein said movable arm pivots on said fixed arm by said elongated pivot journal; and
    wherein said curvilinear guide way traverses said fixed arm;
    also wherein said cam follower guide member extends from said movable arm and wherein said curvilinear guide way is in said fixed arm wherein said movable arm cam follower guide member rides in said fixed arm guide way.

6. The hinge mechanism of claim 4 wherein said biasing means is a spring being positioned to pull in a tangential direction against the outward movement of said movable arm with respect to said fixed arm and the to pull in the open position rotated direction.

7. The hinge mechanism of claim 5 also including a gravity detent at the open position end of said fixed arm guide way, said gravity detent holding the open position against the force of the spring.

8. The hinge mechanism of claim 6 wherein said damper includes:

a toothed track on said fixed arm;

a pinion gear rotateably mounted on said movable arm and positioned to engage said fixed arm toothed track; and a friction-type clutch operating against the rotational acceleration and deceleration of said pinion gear.

9. The hinge mechanism of claim 7 wherein said gravity detent is at the open position of said fixed arm guide way.

10. The hinge mechanism of claim 8 wherein said toothed track has a downward curved ramp section at the closed position end thereof, said downward curved ramp section acting with said pinion gear against the closed position force of said spring to created a closed position detent action.

11. The hinge mechanism of claim 9 wherein said pivot boss, said elongated pivot journal, said curvilinear guide way and said toothed track and pinion gear cooperate against the spring force to permit said movable arm to move radially outwardly as it rotates from the closed position to the open position and to move radially inwardly as it rotates from the open position to the closed position.

12. The hinge mechanism of claim 10 wherein said cam follower guide member engages the inward side of said guide way as the movable arm is moved to the closed position, and engages the outward side of said guide way as the movable arm is moved to the open position.

13. The hinge mechanism of claim 1, wherein said second movable arm is pivotally connected at one end thereof to said first fixed arm, and wherein said articulation guide way is a radially extending slot at the end of said movable arm which is opposite said pivotal connection end.

14. The hinge mechanism of claim 5, also including a rectangular detent associated with said pivot boss and a hook member associated with said pivot journal, said hook member engaging said rectangular detent when said movable arm moves to said closed position.

15. A hinge mechanism, comprising:

a first arm;

a second arm pivotally connected to the first arm, whereby said arms are moved relative to one another between a closed position and an open position, said second arm having a receiving structure thereon;

a damper fitted on said second arm receiving structure;

a track positioned on said first arm for said damper to operate against when said first and second arms move between said first and second position; and means biasing said first and second arms to a selected position;

wherein said track is a toothed track and said damper is a friction gear engaging said tooth track;

wherein said receiving structure is a cutout of said second arm in which said friction gear is mounted; and wherein said biasing means is a spring member which biases said first and second arms to the open position.

16. The hinge mechanism of claim 15 also including a curvilinear cam path in said first arm and a cam follower on said second arm for engaging said first arm cam path wherein the cooperation of said cam follower and said curvilinear cam path effect a pivotal arc motion of said second movable arm with respect to said first fixed arm.

17. The hinge mechanism of claim 16 wherein said first and second arms pivotal connection permits the articulated motion of said second radial arm in a radial direction to said pivotal arc motion of said second movable arm to said first fixed arm.

18. A detented and dampened hinge mechanism with push-pull operation, comprising:

a first elongate fixed member mountable to a first structure;

a second elongate movable member mountable to a second structure, said first and second members being pivotally connected for movement in a plane of the elongate extension of each;

a dampening structure mounted to said second elongate movable member and movable therewith, said dampening structure operating between the first and second elongate members to control the relative rate of pivoting motion there between, said dampening structure including a rotating member on said second elongate movable member which operates against said first elongate fixed member; and a detent for holding said first and second elongate members in a selected pivoted position.

19. The detented and dampended hinge mechanism of claim 18, wherein said dampening structure includes a rack mounted to one elongate member and a pinion mounted to the other elongate member, said pinion operating against said rack, said pinion including a rotation acceleration-deceleration inhibitor structure.

* * * * *